United States Patent
Kitabayashi et al.

(10) Patent No.: US 6,857,745 B2
(45) Date of Patent: Feb. 22, 2005

(54) METHOD OF MANUFACTURING ILLUMINATION OPTICAL UNIT, APPARATUS FOR MANUFACTURING ILLUMINATION OPTICAL UNIT, ILLUMINATION OPTICAL UNIT MANUFACTURED BY THE MANUFACTURING METHOD, AND PROJECTOR

(75) Inventors: Masashi Kitabayashi, Horigane-mura (JP); Naoyuki Miyajima, Matsumoto (JP); Masaki Maruyama, Matsukawa-mura (JP)

(73) Assignee: Seiko Epson Corporation, Tokyo (JP)

( * ) Notice: Subject to any disclaimer, the term of this patent is extended or adjusted under 35 U.S.C. 154(b) by 38 days.

(21) Appl. No.: 10/617,394

(22) Filed: Jul. 11, 2003

(65) Prior Publication Data

US 2004/0165151 A1 Aug. 26, 2004

(30) Foreign Application Priority Data

Jul. 15, 2002 (JP) ........................................ 2002-205458

(51) Int. Cl.⁷ .................... G03B 21/14; G03B 21/26; G03B 21/00; G02B 27/28
(52) U.S. Cl. ........................ 353/20; 353/30; 353/32; 353/34; 353/38; 353/82; 353/121; 359/500; 359/501
(58) Field of Search ................... 353/20, 30, 32, 353/34, 38, 82, 121; 359/500–501, 483

(56) References Cited

U.S. PATENT DOCUMENTS

| | | | | |
|---|---|---|---|---|
| 6,092,901 A | * | 7/2000 | Hashizume et al. | 362/19 |
| 6,460,998 B1 | * | 10/2002 | Watanabe | 353/20 |
| 6,491,397 B2 | * | 12/2002 | Ogawa et al. | 353/20 |
| 2002/0018183 A1 | | 2/2002 | Ito et al. | 353/20 |
| 2002/0021416 A1 | | 2/2002 | Ogawa | 353/51 |

FOREIGN PATENT DOCUMENTS

| | | |
|---|---|---|
| JP | A-6-118283 | 4/1994 |
| JP | A-8-227029 | 9/1996 |
| JP | A-2000-23109 | 1/2002 |
| JP | A-2000-31843 | 1/2002 |

* cited by examiner

*Primary Examiner*—Judy Nguyen
*Assistant Examiner*—Magda Cruz
(74) *Attorney, Agent, or Firm*—Oliff & Berridge, PLC

(57) ABSTRACT

A first positioning step positions and fixes a light focusing element and a polarization converting element. A beam introducing step introduces beams to a beam splitting element, the light focusing element and the polarization converting element. An optical image forming step detects an optical image through the above elements. An illumination-area comparing step performs an image processing on the detected optical image to compare an illumination area formed by the optical image with a designed illumination area. A beam-splitting-element position-adjusting step adjusts the position of the beam splitting element.

10 Claims, 24 Drawing Sheets

METHOD OF MANUFACTURING ILLUMINATION OPTICAL UNIT, APPARATUS FOR MANUFACTURING ILLUMINATION OPTICAL UNIT, ILLUMINATION OPTICAL UNIT MANUFACTURED BY THE MANUFACTURING METHOD, AND PROJECTOR

BACKGROUND OF THE INVENTION

1. Field of the Invention

The present invention relates to a method of manufacturing an illumination optical unit, an apparatus for manufacturing an illumination optical unit, an illumination optical unit manufactured by the manufacturing method, and a projector.

2. Description of Related Art

Projectors including a light source lamp, an electro-optical device for modulating beams emitted from the light source lamp according to image information and a projection optical system for enlarging and projecting the beams modulated by the electro-optical device have been used in the related art.

In such projector, in order to evenly and uniformly illuminate an image forming area of the electro-optical device with the beams emitted from the light source lamp, an illumination optical system composed of a plurality of optical elements is interposed between the light source lamp and the electro-optical device.

The illumination optical system is constituted by, for example, a beam splitting element for splitting the light emitted from a light source lamp into a plurality of partial beams, a light focusing element for focusing the plurality of split partial beams on the image forming area of the electro-optical device, and a polarization converting element for making polarization directions of the beam emitted from the light source lamp uniform in a substantially identical direction.

In the case of adjusting such an illumination optical system, in the related art, the light source lamp, the beam splitting element, the light focusing element, the polarization converting element and the electro-optical device are installed in an optical component casing for receiving these optical components. Also, the positions of the beam splitting element, the light focusing element and the polarization converting element are adjusted while actually projecting the beams emitted from the light source lamp on a screen by determining the brightest position having no unevenness as the optimal position as seen with the naked eye.

Recently, miniaturization of the projector entailed need for shortening the length of an optical path from the light source lamp to the electro-optical device and for improving light focusing efficiency by the illumination optical system interposed between the light source lamp and the electro-optical device.

However, in case of adjusting the related art illumination optical system, the positions of the beam splitting element, the light focusing element and the polarization converting element are respectively adjusted with respect to the optical component casing, and thus it is difficult to perform the position adjustment of these optical components with high precision.

Moreover, because the optimal positions of those optical components are determined with the naked eye from the optical image projected on a screen, it is possible that the accuracy of adjustment varies depending on a person who adjusts the positions, or the accuracy of adjustment deteriorates with the lapse of a working time.

A method is desirable to make the optical elements unit in order to improve the focusing efficiency by the illumination optical system by adjusting the positions of the plurality of optical elements with a high precision degree.

SUMMARY OF THE INVENTION

The present invention provides a method of manufacturing an illumination optical unit with a high precision and efficiency in which a beam splitting element, a light focusing element and a polarization converting element are integrated, an apparatus for manufacturing an illumination optical unit, an illumination optical unit manufactured by the manufacturing method, and a projector.

A method according to an aspect of the present invention is for manufacturing an illumination optical unit including a beam splitting element for splitting a beam emitted from a light source into a plurality of partial beams, a light focusing element for focusing the partial beams, and a polarization converting element for making the polarization directions of the partial beams uniform, the method including: a first positioning step of adjusting a relative position on a predetermined optical path of the light focusing element and the polarization converting element on the basis of the shapes thereof, and fixing the position of the light focusing element and the polarization converting element; a beam introducing step of introducing a beam on the light focusing element and the polarization converting element of which position is adjusted during the first positioning step and the beam splitting element disposed on the predetermined optical path; an optical image forming step of transmitting the beam introduced by the beam introducing step into the light focusing element, the polarization converting element and the beam splitting element to form an optical image on a projection screen; an optical image detecting step of detecting the optical image formed in the optical image forming step; an illumination-area comparing step of calculating a comparison result of an illumination area of the optical image detected in the optical image detecting step with a designed illumination area; an optimal-state determining step of determining whether the illumination area of the optical image is in the optimal state with respect to the designed illumination area or not on the basis of the comparison result from the illumination-area comparing step; a beam-splitting-element position-adjusting step of adjusting the relative position of the beam splitting element with respect to the light focusing element and the polarization converting element on the basis of the comparison result calculated in the illumination area comparing step when the illumination area of the optical image is determined not in the optimal position in the optimal-state determining step; and a second positioning step of fixing the position of the beam splitting element when the illumination area of the optical image is determined to be in the determined optimal state in the optimal-state determining step.

As the beam splitting element, for example, a lens array can be employed where lenses are arranged in a matrix, on a plane orthogonal to the illumination optical axis, according to an image forming area of the electro-optical device. Moreover, other than the lens array, a rod or the like can be also employed for splitting the incident light into a plurality of partial beams using inside reflection. That is, various optical elements can be employed so far as the light emitted from a light source is split into a plurality of partial beams.

According to such present invention, in the illumination area comparing process, the detected illumination area of the detected optical image can be compared with the designed illumination area, where, for example, the position of outer edges of the illumination area formed by the optical image, the distance between predetermined positions of the outer edges thereof, and the area within the outer edges thereof are compared with the position of outer edges of the designed illumination area, the distance between the predetermined positions of the outer edges thereof, the area within the outer edges thereof, respectively. Then, for example, the determination whether the illumination area formed by the optical image is equal to, greater than, or smaller than the designed illumination area can be calculated as the comparison result. Further, the relative value of the designed illumination area may be calculated. Further, since the relative position of the beam splitting element with respect to the light focusing element and the polarization converting element is adjusted in the beam splitting element position adjusting process on the basis of the comparison result in the illumination area comparing step, the relative position can be efficiently adjusted. During the optimal-state determining step, since the optimal-state of the illumination area of the optical image with respect to the designed illumination area can be determined on the basis of the above-mentioned results of comparison from the illumination area comparing process, the optimal position of the beam splitting element can be easily and accurately determined.

Therefore, the optical relative positions of respective optical elements can be efficiently adjusted with high precision. As a result, the illumination optical unit can be manufactured with improved light focusing efficiency.

A position adjustment of only the beam splitting element with respect to the light focusing element and the polarization converting element, which are positioned and fixed in the first positioning process, is carried out in the beam splitting element position adjusting process. Also, the beam splitting element is positioned and fixed in the second positioning and fixing step after adjusting the position thereof.

Therefore, the position of the illumination area formed by the illumination optical unit relative to the designed illumination area can be adjusted with a simple step and the manufacturing efficiency of the illumination optical unit can be improved.

Preferably, in the method of manufacturing an illumination optical unit, a criterial frame representing the shape of the designed illumination area is formed on the projection screen, and the optical image on the projection screen and the criterial frame are detected by an image pick-up device in the optical image detecting step, the illumination-area comparing step including: an image fetching step of fetching an image detected in the optical image and the criterial frame detected by the optical image detecting step as an image, a brightness-value acquiring step of acquiring the brightness-value of the optical image in units of pixels by the image fetched in the image fetching step; a scanning-line selecting step of selecting scanning lines set to extending inside and outside the illumination area of the optical image; a brightness-value adjusting-curve acquiring step of acquiring a brightness-value adjusting curve showing a change in brightness values according to pixel position on the scanning line selected in the scanning-line selecting step on the basis of the brightness-value acquired in the brightness-value acquiring step; an approximate-straight-line calculating step of calculating an approximate straight line by linearly approximating a brightness-value adjusting section between a portion showing the outside of the illumination area of the optical image and a portion showing the inside of the illumination area based on the brightness-value adjusting curve acquired by the brightness-value adjusting-curve acquiring step; a boundary-point acquiring step of acquiring boundary points of the illumination area of the optical image on the basis of the approximate straight line calculated in the approximate-straight-line calculating step; and an illumination-margin calculating step of calculating an illumination margin of the illumination area of the optical image relative to the criterial frame by comparing the positions of the boundary points acquired in the boundary-point acquiring step with the position of the criterial frame.

In such method, ambiguous adjustment accuracy according to a prior art can be improved and the illumination area of the optical image formed by the illumination optical unit formed on the projection screen and the criterial frame showing the shape of the designed illumination area are detected by the image pick-up element, and the image of the criterial frame detected by the image pick-up element in the illumination area comparing step can be compared with the illumination area of the optical image. Accordingly, optical relative position of the respective optical element can be more precisely and efficiently adjusted and an illumination optical unit having improved light focusing efficiency can be manufactured.

For example, in the illumination area comparing process, the criterial frame image is compared with the illumination area of the optical image according to the following procedure.

(A) First, from the image fetching step, an optical image detected from the image detecting step is fetched by the image fetching device such as a video capture board, and from the brightness-value acquiring step, the brightness value of the acquired optical image is acquired by dividing it into 256 gradations of, for example, 0 to 255.

(B) Next, from the scanning-line selecting step, for example, one transversely extended scanning line set inside and outside the illumination area of the optical image is selected. Then, from the brightness-value adjusting-curve acquiring step, a brightness-value adjusting curve is acquired where the X-axis (transverse axis) as a pixel position on the selected scanning line and the Y-axis (longitudinal axis) as the corresponding brightness value are plotted, respectively, on XY coordinates.

The acquired brightness-value adjusting curve is acquired in a substantially crank shape or S shape from the outside toward the central portion of the optical image, in a boundary portion of the illumination area of the optical image. In other words, the brightness-value adjusting curve consists of a portion having a brightness value of about 0 and shown outside of the illumination area, a portion having a brightness value of about 255 and shown inside of the illumination area, and a brightness-value adjusting section.

Moreover, a brightness-value adjusting curve is acquired in a reversed crank shape or a reversed S shape contrary to the above curve shape, if the curve directs from the central portion of the illumination area of the optical image toward the outside thereof. Similarly, a brightness-value adjusting curve is also acquired for a longitudinal scanning line simply by substituting the transverse with the longitudinal.

(C) Next, in the approximate-straight-line calculating step, for example, an approximate straight line can be calculated by linearly approximating the whole brightness-value adjusting section by a method such as a least-square method. Further, an approximate straight line can be calculated by taking out a part of the brightness-value adjusting section without using the whole brightness-value adjusting section and performing a linear approximation on the basis of the opposite ends of the part.

(D) Then, from the boundary point acquiring process, for example, an intersection point between the brightness-value adjusting section and a line showing a brightness value of 255 gradation as a brightness value (hereinafter, a line having a brightness value of 255 gradation) is acquired, and this intersection point is used as a point showing the boundary of the illumination area, i.e., a boundary point showing a limit position having a sufficient brightness value for illumination.

Moreover, in addition to the intersection point between the brightness-value adjusting section and the line having brightness value of 255 gradation, an X coordinate, which is shifted by a predetermined number of pixels from an X coordinate of the intersection point between the brightness-value adjusting section and the line having the brightness value of 255 gradation, may be used as a pixel position of the boundary point. Further, an intersection point between the brightness-value adjusting section and a line linearly approximating a portion shown inside of the illumination area may be used as a boundary point.

(E) Finally, from the illumination-margin calculating step, for example, a relative value of the position of the boundary point or the distance between boundary points, with respect to the pixel position or the distance between the pixel positions, of the criterial frame image on a scanning line, is acquired, and this relative value is calculated as an illumination margin.

Moreover, the above operations (B) to (D) may be carried out for a plurality of transverse and longitudinal scanning lines set to extending inside and outside the illumination area to acquire boundary points for all the scanning lines, and then the illumination margin may be calculated in the illumination-margin calculating step on the basis of these acquired boundary points. In this case, a relative value of a predetermined position of outer edges of an illumination area formed by a group of boundary points with respect to a predetermined pixel position of the criterial frame image, a relative value of the distance between the predetermined positions of the outer edges with respect to the distance between predetermined pixel positions of the criterial frame image, a relative value of the area within the outer edges with respect to the area of the criterial frame image, are acquired. Then, the relative value may be calculated as an illumination margin M.

In the beam introducing process, when beams are introduced from a light source lamp, the beams having a predetermined brightness value are basically emitted. However, a change that the brightness value becomes small momentarily, and the like may be caused under the influence of the outside environment at the time of manufacture, etc.

However, according to the present invention, the inclination of the brightness-value adjusting section of the brightness-value adjusting curve is not affected by any change in the light source lamp or the like, and the boundary points are specified by a linear approximation of such non-affected brightness-value adjusting section. Therefore, the exact information of the illumination area can be calculated.

Preferably, in a method of manufacturing the illumination optical unit according to the present invention, the criterial frame is set to be substantially square in the illumination-area comparing step, the scanning-line selecting step, the brightness-value adjusting-curve acquiring step, the approximate-straight-line calculating step and the boundary-point acquiring step are performed a plurality of times along the mutually opposing sides of the criterial frame image, and, in the illumination-margin calculating step, the illumination margin M is calculated according to the following Expression (1), where Da represents a distance between opposing sides of the criterial frame, and Ds represents a distance between a boundary point along one side of the mutually opposing sides of the criterial frame and another boundary point along the other side of the mutually opposing sides of the criterial frame in a direction orthogonal to the mutually opposing sides.

$$M=(Ds-Da)/2 \tag{1}$$

According to the above method, when the criterial frame showing the shape of the designed illumination area is set in a substantially square shape, the optimal illumination margin can be calculated on the basis of a plurality of boundary points acquired along the mutually opposing sides of the criterial frame image.

For example, in case a boundary point acquired in the above step (D) based on a selected single scanning line is a unique point on account of abnormal measurement environment, it is possible that the exact illumination margin of the whole illumination area cannot be calculated when the illumination margin is calculated by the single scanning line selected in the above step (E).

For example, the above operations (B) to (D) may be carried out for a plurality of the mutually opposed transverse and longitudinal scanning lines of the criterial frame image set to extending inside and outside the illumination area to acquire boundary points for the plurality of the scanning lines. Also, the illumination margin M is calculated by Expression 1 in the illumination-margin calculating step on the basis of the shortest distance Ds between a boundary point along one side of a pair of mutually opposed sides of the criterial frame image and a boundary point along the other side thereof among a plurality of the acquired boundary points H, in the direction orthogonal to the pair of the criterial frame image, and on the basis of the distance Da between a pair of pixel positions of the criterial frame image.

Therefore, for example, even if any unique boundary point among a plurality of the acquired boundary points H is present inside of the criterial frame image showing the shape of the designed illumination area, the illumination margin of the whole illumination area LA of the optical image with respect to the criterial frame image can be surely calculated.

Preferably, in the method of manufacturing the illumination optical unit, the illumination-area comparing step includes: a criterial frame-image center-position calculating step of calculating a center position of the criterial frame from the image fetched in the image fetching step; an optical-image center-position calculating step of calculating a center position of the illumination area of the optical image from the positions of boundary points acquired in the boundary points acquiring step; and an image-center deviation-amount calculating step of calculating the deviation amount of the center position of the criterial frame and the center position of the illumination area of the optical image; and wherein the optimal-state determining step determines that the illumination area of the optical image is in the optimal state when the illumination margin M, calculated in the illumination-margin calculating step, is at least the preset threshold value and when the deviation amount calculated in the image-center deviation-amount calculating step is the preset threshold value or below.

If any error occurs in a plurality of boundary points acquired from the illumination area comparing process, it is possible that, even when the position of the beam splitting element is set on the basis of the illumination margin calculated in the illumination margin calculating step, the central axis of the designed illumination area and the central axis of the illumination area of the optical image may be shifted. For example, if the central axis of the illumination area of the optical image is deviated from the central axis of the designed illumination area, it is possible to manufacture an illumination optical unit having a deviated optical axis.

In the present invention, the illumination-area comparing step includes the separating-frame-image center-position calculating step, the optical-image center-position calculating step, and the image-center deviation-amount calculating step. Therefore, the deviation amount between the central axis of the designed illumination area and the central axis of the illumination area of the optical image can be calculated.

Further, in the optimal-state determining process, when the illumination margin M is at least the preset threshold values and the deviation amount of the center positions calculated in the image-center deviation-amount calculating step is the preset threshold value or below, it determines that the illumination area of the optical image is in the optimal state. Accordingly, even if any error occurs in a plurality of boundary points acquired in the illumination area comparing process, the illumination optical unit can be manufactured ensuring the effective illumination margin with respect to the designed illumination area. Moreover, the illumination optical unit with no deviation in illumination optical axis can be manufactured.

Moreover, in the optimal-state determining process, when the illumination margin M is determined, the preset threshold value may be used as a lower limit and whether the illumination margin M is located within the range having an upper limit may be determined. As such, an illumination area having a predetermined value of illumination margin can be ensured, and an illumination optical unit can be manufactured ensuring an illumination area of the optical image within the range of the optimal illumination area.

Preferably, in the method of manufacturing the illumination optical unit, the beam-splitting-element position-adjusting step includes: when an optical axis of the beams introduced in the beam introducing step is the Z axis and when two axes orthogonal to the Z axis and orthogonal to each other are the X axis and the Y axis, respectively, an X-axis position-adjusting step of moving the beam splitting element in the direction of the X axis; a Y-axis position-adjusting step of moving the beam splitting element in the direction of the Y axis; and an in-plane rotational-position-adjusting step of rotating the beam splitting element around the Z axis.

In such a method, the beam-splitting-element position-adjusting step includes an X-axis position adjusting step, Y-axis position adjusting step, and the in-plane rotational-position-adjusting step. Therefore, the position adjustment of the beam splitting element can be carried out with high precision. As a result, the illumination optical unit can be effectively manufactured with high precision.

Preferably, in the method of manufacturing the illumination optical unit, an uncured photo-curing adhesive is coated on the beam splitting element before the illumination area comparing step; and the photo-curing adhesive is irradiated with rays to cure the photo-curing adhesive to fix the beam splitting element in the second positioning process.

In such a method, the beam splitting element position adjusting step is conducted while the photo-curing adhesive coated on the beam splitting element is uncured, and in the second positioning process rays are irradiated on the photo-curing adhesive to cure the photo-curing adhesive to fix the beam splitting element. Accordingly, the beam splitting element can be securely fixed after adjusting the position of the beam splitting element to the optimal state, so that the illumination optical unit can be easily and righteously manufactured, and the manufacturing efficiency can be improved.

Further, the present invention provides a manufacturing apparatus of an illumination optical unit for embodying the method of manufacturing the illumination optical unit of the present invention. In other words, the present invention provides an apparatus for manufacturing an illumination optical unit including a beam splitting element for splitting a beam emitted from a light source into a plurality of partial beams, a light focusing element for focusing the partial beams and a polarization converting element for making polarization directions of the partial beams uniform, the apparatus including: an element holding member for holding the light focusing element and the polarization converting element which are positioned and fixed by adjusting their relative position on the basis of the shapes thereof on a predetermined optical path; a beam-splitting-element holding member for holding the beam splitting element disposed on the predetermined optical path; a light source for introducing beams to the beam splitting element, the light focusing element, and the polarization converting element; a projection screen onto which an optical image of the beams is projected through the beam splitting element, the light focusing element and the polarization converting element; a position adjusting unit for adjusting the relative position of the beam splitting element with respect to the light focusing element and the polarization converting element; a positioning and fixing unit for fixing the position of the beam splitting element; an image pick-up element for picking-up an optical image formed on the projection screen; an image fetcher for fetching the optical image picked-up by the image pick-up element as an image; and an image processor for processing the image fetched by the image fetcher, wherein the image processor includes: an illumination area comparing device for calculating a comparison result of an illumination area of the optical image with a designed illumination area based on the image fetched by the image fetcher; and an optimal state determining device for determining whether the beam splitting element is located at the optimal position on the basis of the comparison result from the illumination area comparing device.

As the image pick-up element, for example, image pick-up elements such as charge-coupled devices (CCD) or metal oxide semiconductors (MOS) can be employed.

Further, as the image fetcher, video capture boards or etc. can be employed for acquiring electrical signals outputted from the image pick-up element and converting the electrical signals into image signals readable by an image processor to output the readable image signals.

Further, as a respective device constituting the image processor, for example, program, which is executed on an operating system (OS) for performing the control of operation of a computer, can be configured.

In such manufacturing apparatus of an illumination optical unit of the present invention, the processes similar to the above-mentioned manufacturing method of the illumination optical unit can manufacture the illumination optical unit. Therefore, workings and effects similar to the above can be enjoyed.

According to the illumination optical unit manufacturing by the aforementioned manufacturing method of the illumination optical unit, it is possible to manufacture an illumination optical unit with improved light focusing efficiency, to cope with the compactness and the high luminance by applying the unit to a projector, as well as to improve the manufacturing efficiency.

Further, a method for manufacturing the projector may preferably include the above method for manufacturing the illumination optical unit of the present invention, so that a projector adapted for size reduction and high luminance can be efficiently manufactured.

DETAILED DESCRIPTION OF PREFERRED EMBODIMENTS

Hereinafter, an exemplary embodiment of the present invention will be explained with reference to the accompanying drawings.

Structure of a Projector Using an Illumination Optical Unit

Figure 1:
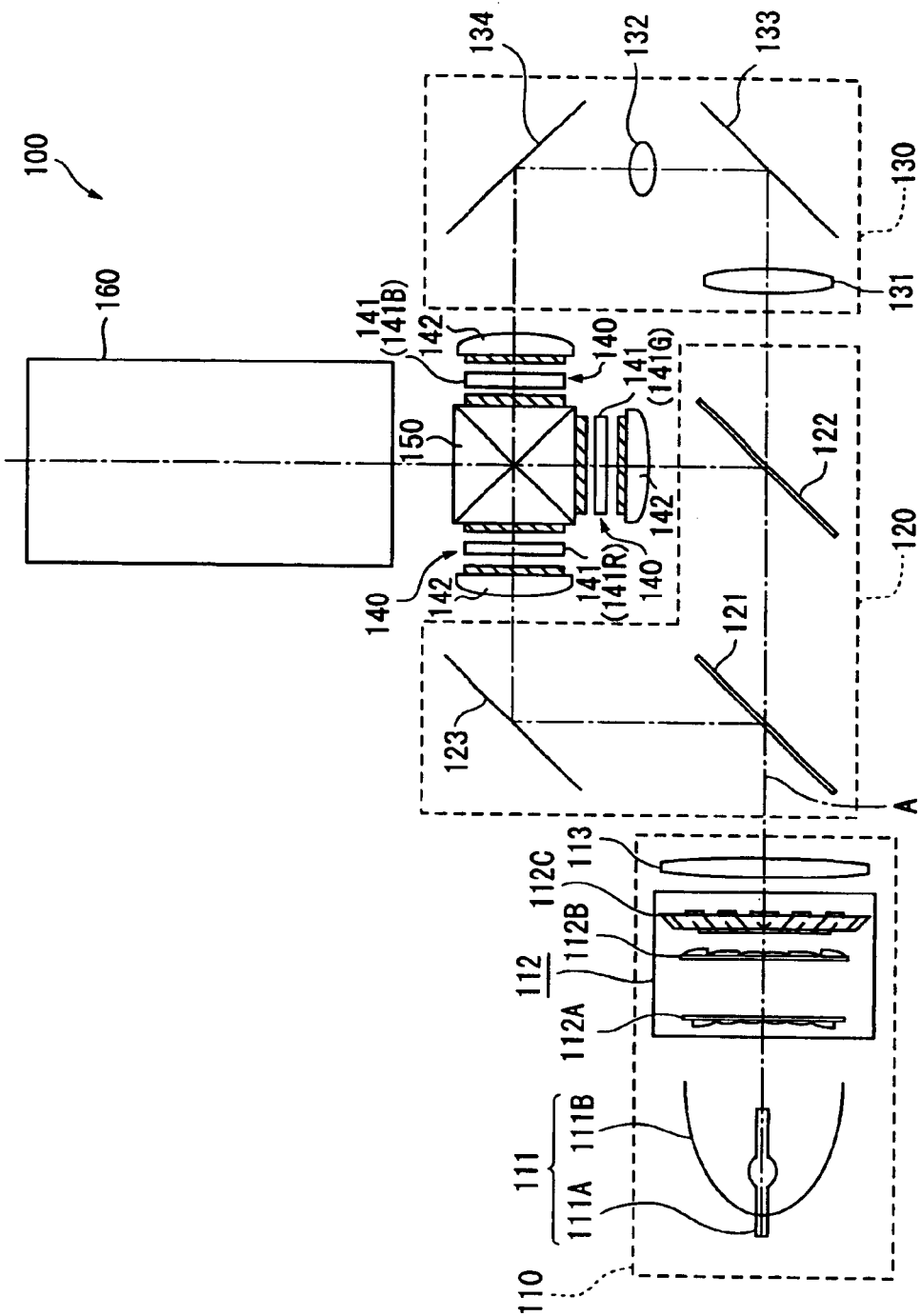
FIG. 1 is a schematic showing a structure of an optical system of a projector including an illumination optical unit according to an exemplary embodiment of the present invention.

FIG. 1 is a schematic showing a structure of an optical system of a projector including an illumination optical unit according to an exemplary embodiment of the present invention.

In FIG. 1, reference numeral 100 indicates a projector. The projector 100 includes an integrated illumination optical system 110, a color separation optical system 120, a relay optical system 130, an electro-optical device 140, a cross dichroic prism 150, and a projection optical system 160.

The integrated illumination optical system 110 is configured to include a light source unit 111, an illumination optical unit 112, and, a superposing lens 113.

The light source unit 111 consist a light source lamp 111A and a reflector 111B.

The illumination optical unit 112 splits the beam emitted from the light source unit 111 into a plurality of partial beams, and focuses the partial beams on an image forming area of a liquid crystal panel 141 of the electro-optical device 140, which will be described later. The illumination optical unit 112 is configured to include a first lens array 112A as a beam splitting element, a second lens array 112B as a light focusing element, and a PBS array 112C as a polarization converting element.

The first lens array 112A splits the beam emitted from the light source lamp 11 into a plurality of partial beams. As shown in FIG. 1, the first lens array 112A is configured to include a plurality of lenses which are arranged in a matrix on a plane orthogonal to an illumination optical axis A. The aspect ratio of the respective lens, corresponds to that of the image forming area of the liquid crystal panel 141, which will be described later.

The second lens array 112B focuses the partial beams split by the first lens array 112A. Similar to the first lens array 112A, the second lens array 112B includes a plurality of lenses which are arranged in a matrix on a plane orthogonal to the illumination optical axis A. The arrangement of the respective lens corresponds to that of the lens constituting the first lens array 112A, but it is unnecessary to correspond the size of the lens to the aspect ratio of the image forming area of the liquid crystal panel 141, as in the first lens array 112A.

Figure 2:
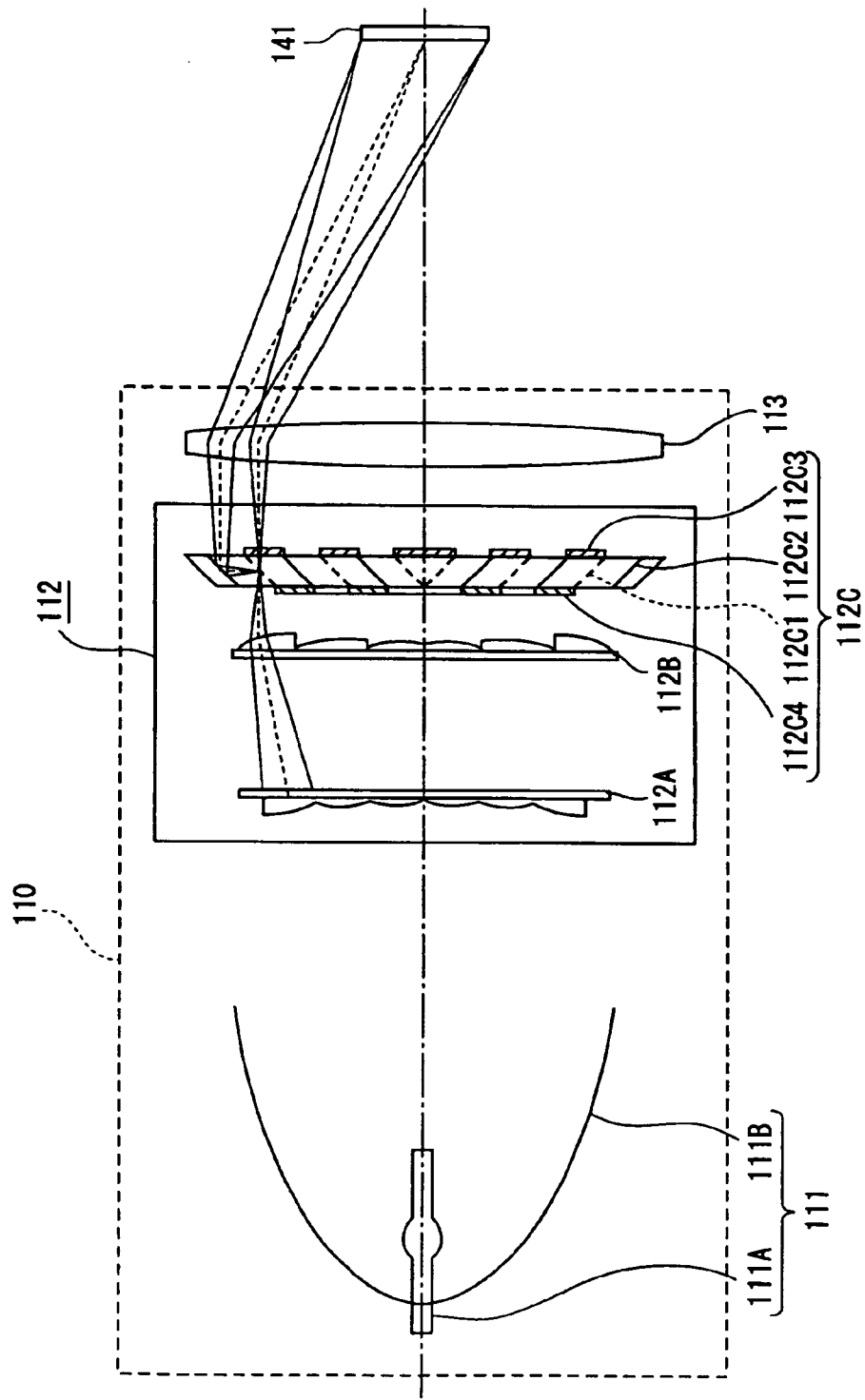
FIG. 2 is a schematic for explaining the structure of the optical system according to the above exemplary embodiment.

The PBS array 112C makes polarization directions of the beams emitted from the light source lamp 111A uniform in substantially one direction. As shown in FIG. 2, the PBS array 112C includes a polarization separating film 112C1, a reflecting film 112C2, a phase difference plate 112C3, and a light shielding plate 112C4.

The polarization separating film 112C1 transmits one of a P polarization beam and a S polarization beam and reflects the other thereof, among polarization beams which are included in the respective partial beams through the first lens array 112A and the second lens array 112B, thereby separating the both P and S polarization beams from each other.

The reflecting film 112C2 bends the polarization beams reflected by the polarization separating film 112C1 at an angle of 90°, to make the emitting directions of the bent polarization beams uniform in the direction of emitting the polarization beams which have transmitted the polarization separating film 112C1.

The phase difference plate 112C3 is disposed in accordance with the emitting positions of the polarization beams which have transmitted the polarization separating film 112C1, to convert polarization directions of the polarization beams. For example, if the transmitted polarization beam is the P polarization beam, the phase difference plate 112C3 converts it into the S polarization beam.

The light shielding plate 112C4 is provided to shield unnecessary beams entering the PBS array 112C, and to realize an appropriate polarization conversion.

Figure 3:
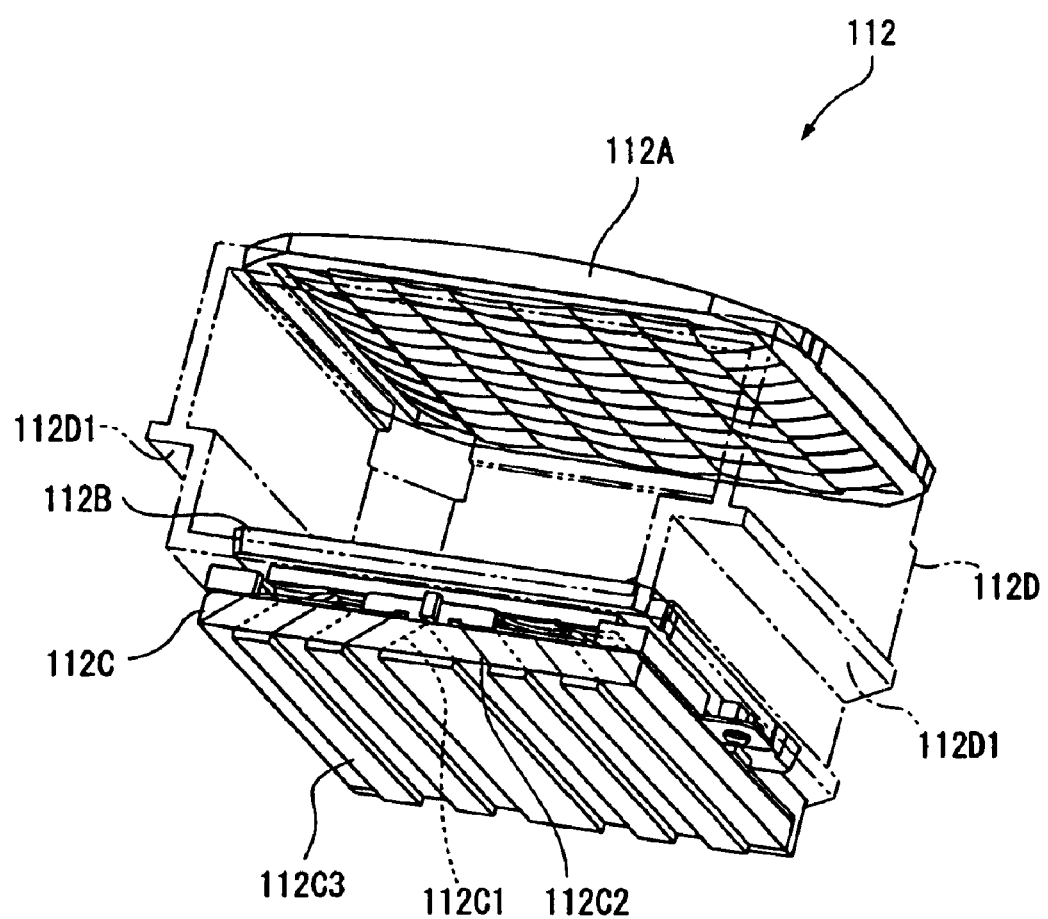
FIG. 3 is a schematic perspective view showing a structure of the illumination optical unit according to the above exemplary embodiment.

As shown in FIG. 3, such illumination optical unit 112 is integrated by a holding frame 112D as a frame.

The holding frame 112D is formed in a substantially box shape. On the lateral sides (right and left lateral sides in FIG. 3) along the direction of the illumination optical axis, engagement portions 112D1 are formed to have a substantially crank-shaped cross section. The engagement portions 112D1 engage a holding-frame holder 21 as an element-holding member for an illumination optical unit installer 20, which will be described later.

Further, at the light entering-side end face and the light emitting-side end face of the holding frame 112D, openings are formed to transmit beams emitted from the light source lamp 111A.

Moreover, one end face, which intersects the light entering and emitting sides of the holding frame 112D, is also opened so that the air within the illumination optical unit 112 does not stay.

Furthermore, in the other end face, which intersects the light entering and emitting sides of the holding frame 112D, holes are formed although specific illustration is omitted for inserting fixing screws to an optical component casing for receiving optical components.

Also, the first lens array 112A is fixed to the light entering-side end face of the holding frame 112D, and the second lens array 112B and the PBS array 112C are fixed to the light emitting-side end face thereof. In this case, the light emitting-side end face is formed in almost the same shape as the outer appearance of the second lens array 112B and the PBS array 112C. For this reason, by fixing these optical elements to the light emitting-side end face while their outer appearances match the end face, these optical elements can be matched with their designed positions.

Further, to fix these optical elements to the holding frame 112D can be performed with an ultraviolet-ray curing adhesive.

As shown in FIG. 2, the superposing lens 113 focuses a plurality of partial beams through the illumination optical unit 112, to superpose the partial beams on the image forming area of the liquid crystal panel 141, which will be described later.

The color separation optical system 120 separates a plurality of partial beams emitted from the integrated illumination optical system 110 into three color lights of red, green and blue. The color separation optical system 120 includes two dichroic mirrors 121 and 122, and a reflecting mirror 123. Specifically, a red light R and the remaining color lights G and B are separated from each other by the dichroic mirror 121, and the green light G and then the blue light B are separated from each other by the dichroic mirror 122.

The relay optical system 130 leads a color light separated by the color separation optical system 120, i.e., the blue light B in case of this exemplary embodiment, to the liquid crystal panel 141B, which will be described later. The relay optical system 130 includes a light entering-side lens 131, a relay lens 132 and reflective mirrors 133 and 134.

The electro-optical device 140 includes three liquid crystal panels 141 (141R, 141G and 141B). The electro-optical device 140 modulates the respective color lights R, G and B which are separated by the color separation optical system 120, using the liquid crystal panels 141R, 141G and 141B in accordance with image information, thereby forming an optical image. The liquid crystal panel 141 uses, for example, a poly-silicon TFT as a switching element.

Moreover, at the preceding stage of an optical path of the liquid crystal panel 141, field lens 142 is disposed. The field lens 142 causes the beams emitted from the integrated illumination optical system 110 to enter parallel to the illumination optical axis A.

The cross dichroic prism 150 composes images modulated for each of the color light emitted from the three liquid crystal panels 141, to form a color image. In the cross dichroic prism 150, a dielectric multilayer film for reflecting the red light and a dielectric multilayer film for reflecting the blue light are formed in a substantially X-shape along the interfaces of four rectangular prisms, and the three color lights are composed by these dielectric multilayer films.

The projection optical system 160 consists of a lens unit including a plurality of group lens, to enlarge and project a color image composed by the cross dichroic prism 150.

Although an optical engine including the above-mentioned integrated illumination optical system 110, color separation optical system 120, relay optical system 130, electro-optical system 140, cross dichroic prism 150 and projection optical system 160 is not specifically shown, the optical engine is received and integrated in the optical component casing for receiving optical components.

In such case, optical components such as lens, mirror, etc., constituting the color separation optical system 120 and the relay optical system 130 are directly fixed to the optical component casing. However, in the integrated illumination optical system 110, since the first lens array 112A, the second lens array 112B and the PBS array 112C are integrated as the illumination optical unit 112 by the holding frames 112D, the illumination optical system 112 is mounted in the optical component casing with the holing frames 112D.

Structure of a Manufacturing Apparatus of the Illumination Optical Unit

Figure 4:
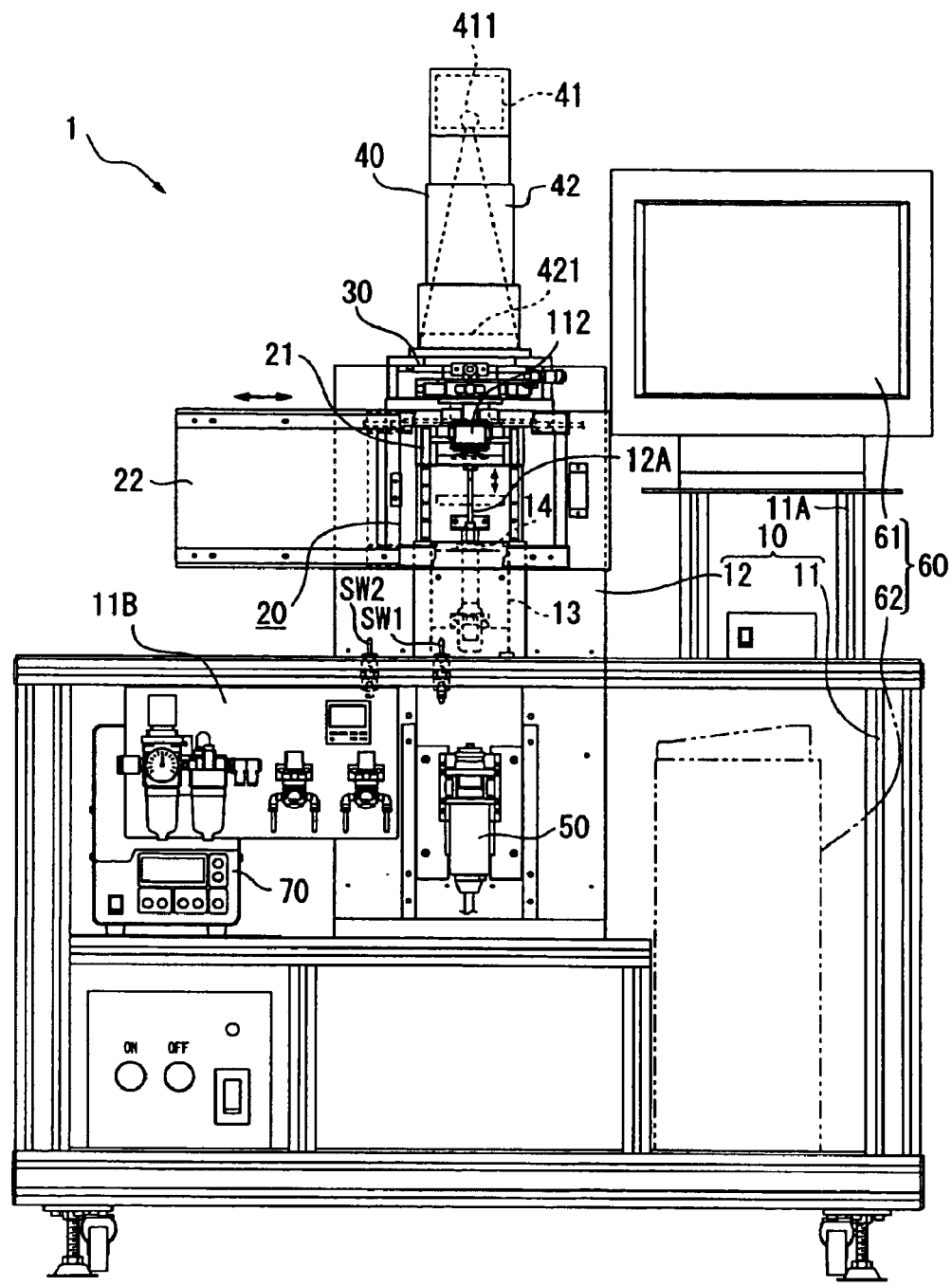
FIG. 4 is a front view showing a manufacturing apparatus of the illumination optical unit for manufacturing the illumination optical unit according to the above exemplary embodiment.
Figure 5:
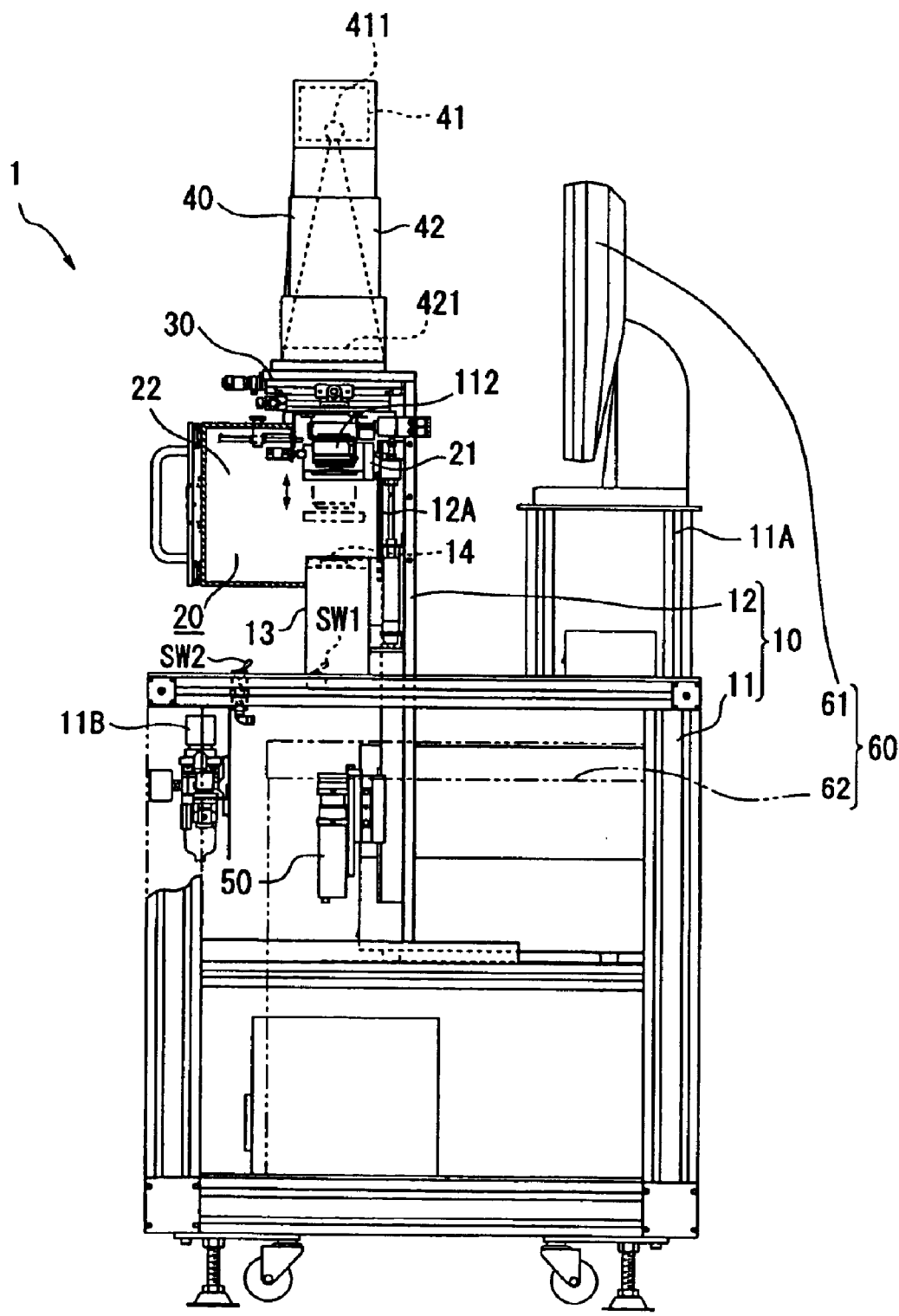
FIG. 5 is a side view showing the manufacturing apparatus of the illumination optical unit for manufacturing the illumination optical unit according to the above exemplary embodiment.

FIG. 4 is a front view showing a manufacturing apparatus of an illumination optical unit for manufacturing the illumination optical unit. FIG. 5 is a side view showing the manufacturing apparatus of an illumination optical unit for manufacturing the illumination optical unit.

In FIG. 4 and FIG. 5, reference numeral 1 indicates a manufacturing apparatus of an illumination optical unit. The manufacturing apparatus of the illumination optical unit 1 is configured to include a manufacturing apparatus main body 10, an illumination optical unit installer 20, a position adjustor 30 and an illuminator 40 as a light source.

The manufacturing apparatus main body 10 includes a base part 11 for receiving a detector, and a supporter 12 of extending vertically from an upper end of the base part 11 and supporting the illumination optical unit installer 20, the position adjustor 30 and the illuminator 40.

On the ceiling surface of the base part 11, a light shielding part 13 is formed in a substantially box-shape being extended vertically along the supporter 12, in a portion which is located directly below an illumination optical axis of the illuminator 40.

The light shielding part 13 has openings formed in its ceiling surface and its bottom surface so as to transmit beams emitted from the illuminator 40. Also, at the opening in the ceiling surface, a projection screen 14 is disposed to form an optical image on the basis of beams through the illumination optical unit 112 which is installed in the illumination optical unit installer 20.

Figure 6:
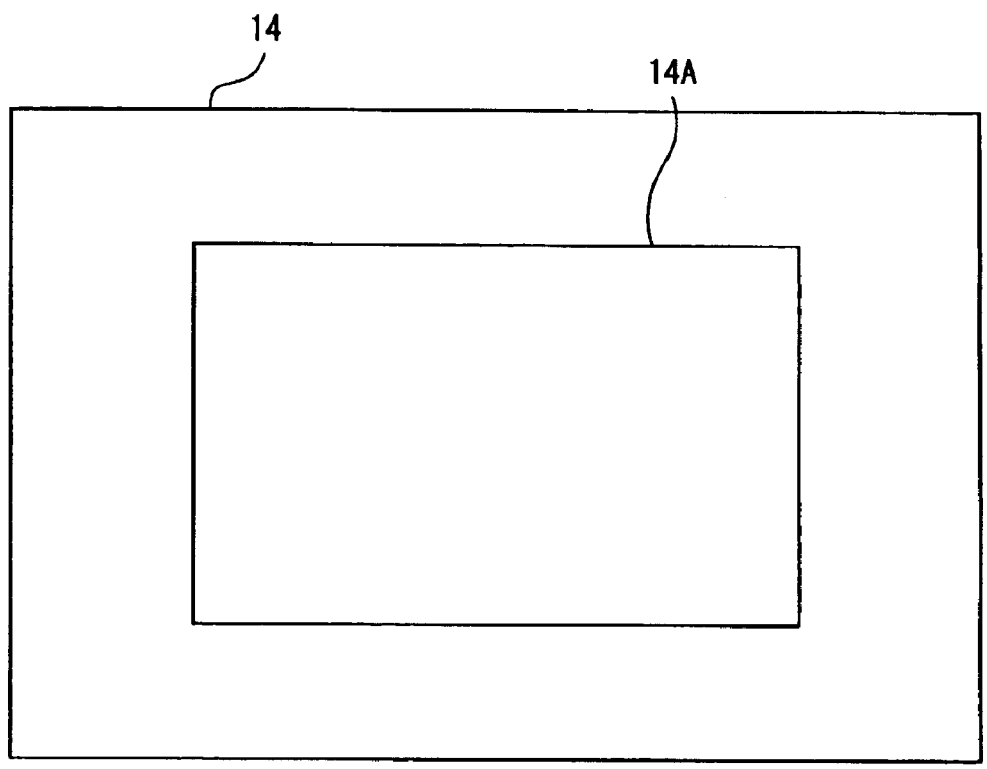
FIG. 6 is a front view showing a structure of a projection screen according to the above exemplary embodiment.

FIG. 6 is a front view showing a structure of a projection screen.

A projection screen 14 is made of opaque glass. As shown in FIG. 6, an approximately rectangular criterial frame 14A is formed on this opaque glass and is set to the size (approximately equal to the size of the image forming area of the liquid crystal panel 141) of a designed illumination area.

Further, although specific illustration is omitted, the projection screen 14 is provided thereon with a field lens similar to the field lens 142 provided at the preceding stage of the optical path of the liquid crystal panel 141 of the projector 100. By this constitution, the optimal illumination optical unit 112 can be manufactured when incorporated into the projector 100.

As shown in FIG. 4 and FIG. 5, a CCD camera 50 as an image pick-up element, a personal computer (PC) 60, an ultraviolet ray irradiator 70 (in FIG. 4) as a positioning and fixing unit are received within the base part 11.

The CCD camera 50 is an area sensor using a charge-coupled device (CCD) as an image pick-up element, and disposed directly below the projection screen 14 on the illumination optical axis of the illuminator 40. Also, the CCD camera 50 picks up an optical image formed on the projection screen 14 to convert the image into electrical signals. Further, the electrical signals are outputted to the PC 60.

Further, although specific illustration is omitted, the CCD camera 50 is received within the base part 11 so that the installed position thereof can be moved with respect to the projection screen 14.

The image pickup element may be MOS (Metal Oxide Semiconductor) sensor and the like instead of CCD (Charged Coupled Device).

The PC 60 is a general personal computer having a display device 61 and a PC main body 62 and which is electrically connected via the predetermined connecting cable (not shown) to the CCD camera 50.

The display device 61 is a general liquid crystal type display device and displays various processed results to the PC main body 62 under the control of the PC main body 62, as will be described later. The display device 61 is located at the rear side (right side in FIG. 5) of the ceiling surface of the base part 11, and mounted on a vertically extended display mounting table 11A.

Figure 7:
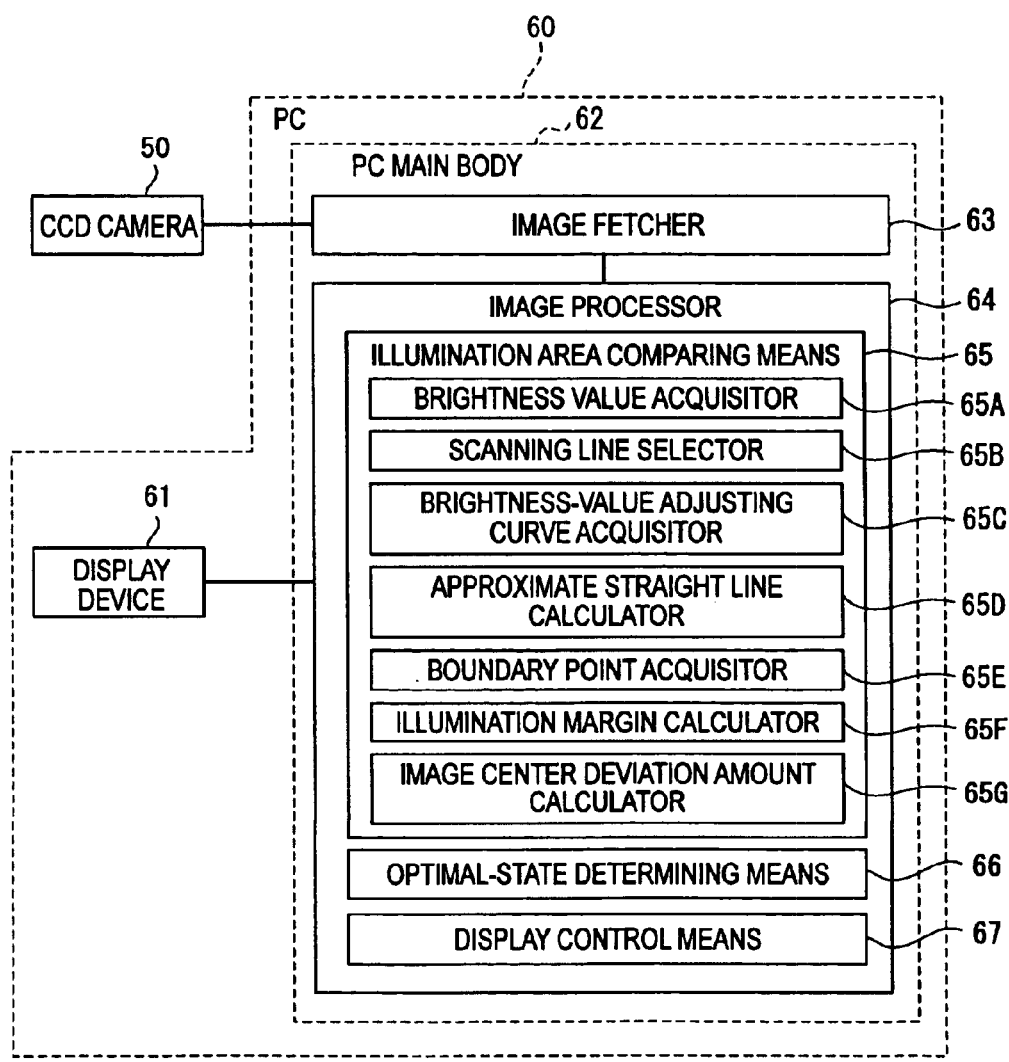
FIG. 7 is a block schematic showing a control structure in a PC main body according to the above exemplary embodiment.

FIG. 7 is a block schematic showing a control structure in a PC main body.

The PC main body 62 acquires an optical image picked-up by the CCD camera 50, and performs an image processing of the optical image to display various processing information on the display device 61. As shown in FIG. 7, the PC main body 62 includes an image fetcher 63 and an image processor 64.

The image fetcher 63 fetches electrical signals on an optical image picked-up by the CCD camera 50, and converts electrical signals into image signals readable by the computer to output the readable image signals to the image processor 64. The image fetcher 63 includes, for example, a video capture board, etc.

The image processor 64 inputs image signals outputted from the image fetcher 63 and performs an image processing on the basis of an optical image of beams through the illumination optical unit 112, to display the processed results on the display 61. The image processor 64 includes an illumination area comparing device 65, an optimal-state determining device 66 and a display control device 67. The respective devices of the image processor 64 may be a program executed on an OS (Operating System) for controlling the operation of the computer.

Figure 8:
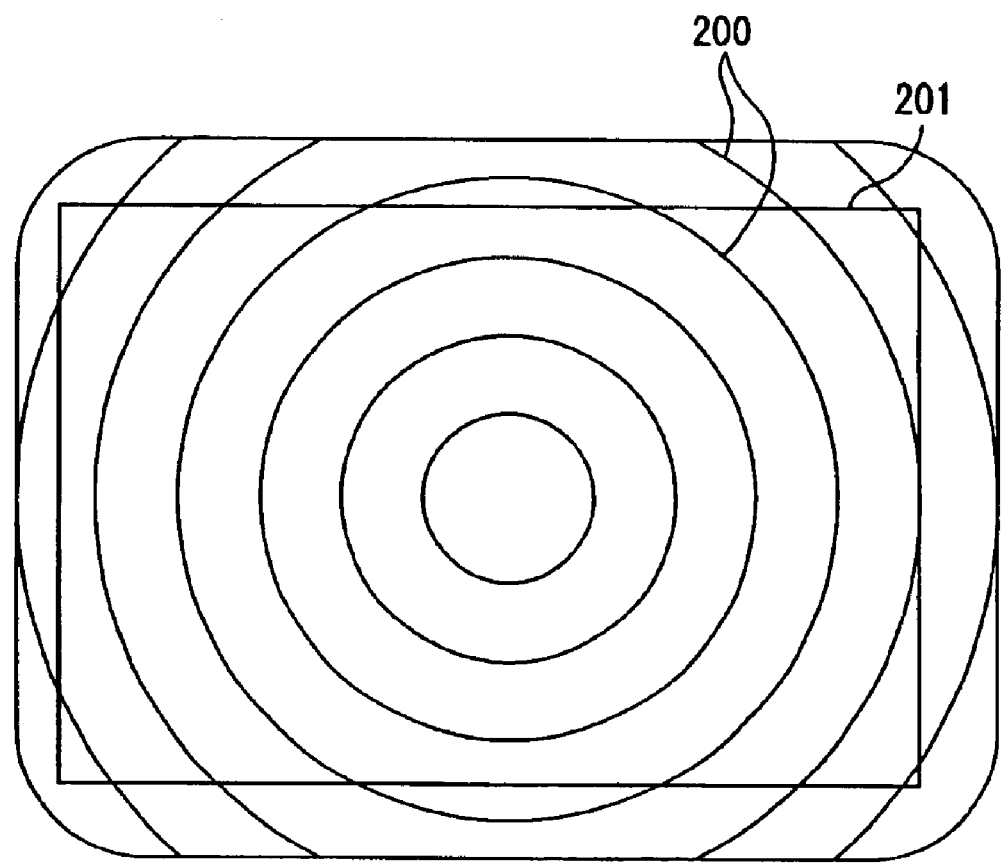
FIG. 8 schematically shows an optical image recognized by an image processor according to the above exemplary embodiment.

FIG. 8 schematically shows an optical image recognized by an image processor 64.

The optical image 200 includes an optical image (criterial frame image) (201) on the basis of the criterial frame 14A formed in the projection screen 14 in addition to an optical image on the basis of beams through the illumination optical unit 112. The luminance of the optical image 200 becomes the greatest at a portion corresponding to the central axis thereof and becomes smaller as the optical image 200 gets away from the center thereof. That is, a fetched optical image 200 becomes gradually darker toward its outside.

The illumination area comparing device 65 compares an illumination area of the optical image 200 of beams through the illumination optical unit 112 with the criterial frame image 201 included in the optical image 200. The illumination area comparing device 65 includes a brightness value acquisitor 65A, a scanning line selector 65B, a brightness-value adjusting curve acquisitor 65C, an approximate straight line calculator 65D, a boundary point acquisitor 65E, an illumination margin calculator 65F, and image center deviation amount calculator 65G.

The brightness value acquisitor 65A acquires image signals outputted from the image fetcher 63 and acquires brightness values of the optical image 200 in units of pixels.

FIG. 9 is a view showing a state of selecting a scanning line from a fetched optical image and of acquiring a brightness-value adjusting curve.

Figure 9A:
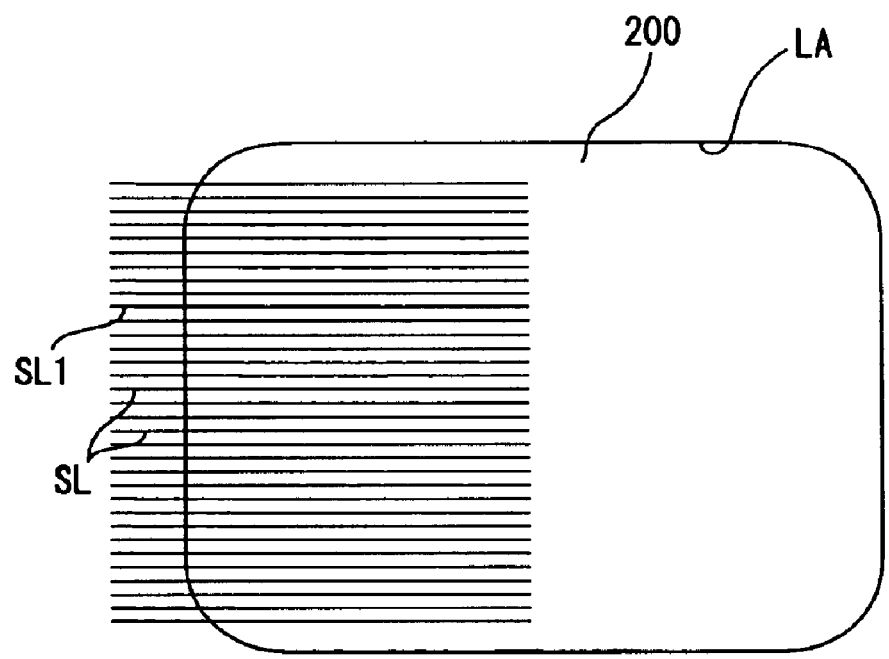
FIGS. 9(A) and 9(B) show a state for selecting a scanning line from an optical image fetched by the PC main body, and for acquiring a brightness-value adjusting curve, in the above exemplary embodiment.

As shown in FIG. 9(A), the scanning line selector 65B selects scanning lines SL set to extending inside and outside an illumination area LA of the optical image 200.

Figure 9B:
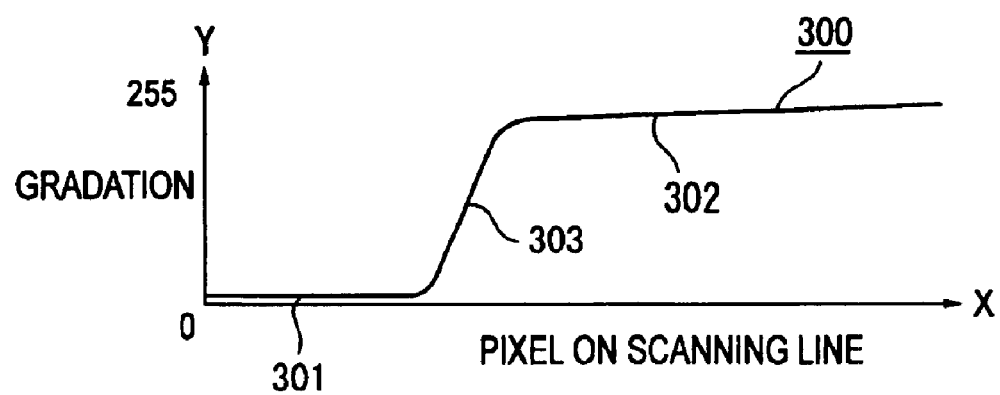

As shown in FIG. 9(B), the brightness-value adjusting curve acquisitor 65C acquires a brightness-value adjusting curve 300 showing the change of brightness values in accordance with pixel positions on the selected scanning lines SL selected by the scanning line selector 65B.

The approximate straight line calculator 65D calculates an approximate straight line of a brightness-value adjusting section 303 from the brightness-value adjusting curve 300 acquired by the brightness-value adjusting curve acquisitor 65C.

The boundary point acquisitor 65E acquires boundary points of the illumination area LA of the optical image 200 on the basis of the approximate straight line calculated by the approximate straight line calculator 65D.

The illumination margin calculator 65F calculates illumination margins of the illumination area LA of the optical image 200 with respect to the criterial frame image 201 on the basis of pixel positions of the criterial frame 201 and boundary points acquired by the boundary point acquisitor 65E. Then, the illumination margin calculator 65F outputs the margin information about the illumination margins.

The image center deviation amount calculator 65G calculates the center position of the criterial frame image 201 and a center position of the illumination area LA of the optical image 200, and calculates the deviation amount of these center positions.

Then, the image center deviation amount calculator 65G outputs the center-position deviation information about the deviation amount of the center positions.

The optimal-state determining device 66 determines whether the illumination area LA of the optical image 200 is located at the optimal position (the optimal position of the first lens array 112A) relative to the criterial frame image 201, on the basis of the illumination margins calculated by the illumination area comparing device 65, and the deviation amount of the center positions. Then, the optimal-state determining device 66 outputs the determination information about the determined results.

The display control device 67 acquires the margin information outputted from the illumination margin calculator 65F, the center-position deviation information outputted from image center deviation amount calculator 65G, and the determination information outputted from the optimal-state determining device 66, and then the device 67 displays the information on the display device 61.

Incidentally, though only one side is illustrated in FIG. 9, the scanning line SL may extend spanning over the both edges so that the boundary points on the both edges can be acquired by a single scanning line.

Referring back to FIG. 4, the ultraviolet ray irradiator 70 irradiates and cures with ultraviolet rays an ultraviolet-ray curing adhesive which is interposed between the first lens array 112A and the light entering-side end face of the holding frame 112D of the illumination optical unit 112, to fix the holding frame 112D and first lens array 112A to each other. Although specific illustration is not shown, the ultraviolet ray irradiator 70 is connected by light guide device such as an optical fiber and includes ray irradiating part (not shown) which is installed in the position adjustor 30.

Referring back to FIG. 4 and FIG. 5, the supporter 12 supports the illumination optical unit installer 20, the position adjustor 30 and the illuminator 40. Further, the supporter 12 includes a rail 12A which extends vertically along the supporter 12 and enables the holding-frame holder 21 as an element-holding member of the illumination optical unit installer 20, which will be described later, to slide vertically.

The illumination optical unit installer 20 is a part where the illumination optical unit 112 is to be installed as a target to be manufactured. The illumination optical unit installer 20 includes the holding-frame holder 21 and an ultraviolet ray shielding cover 22.

Figure 10:
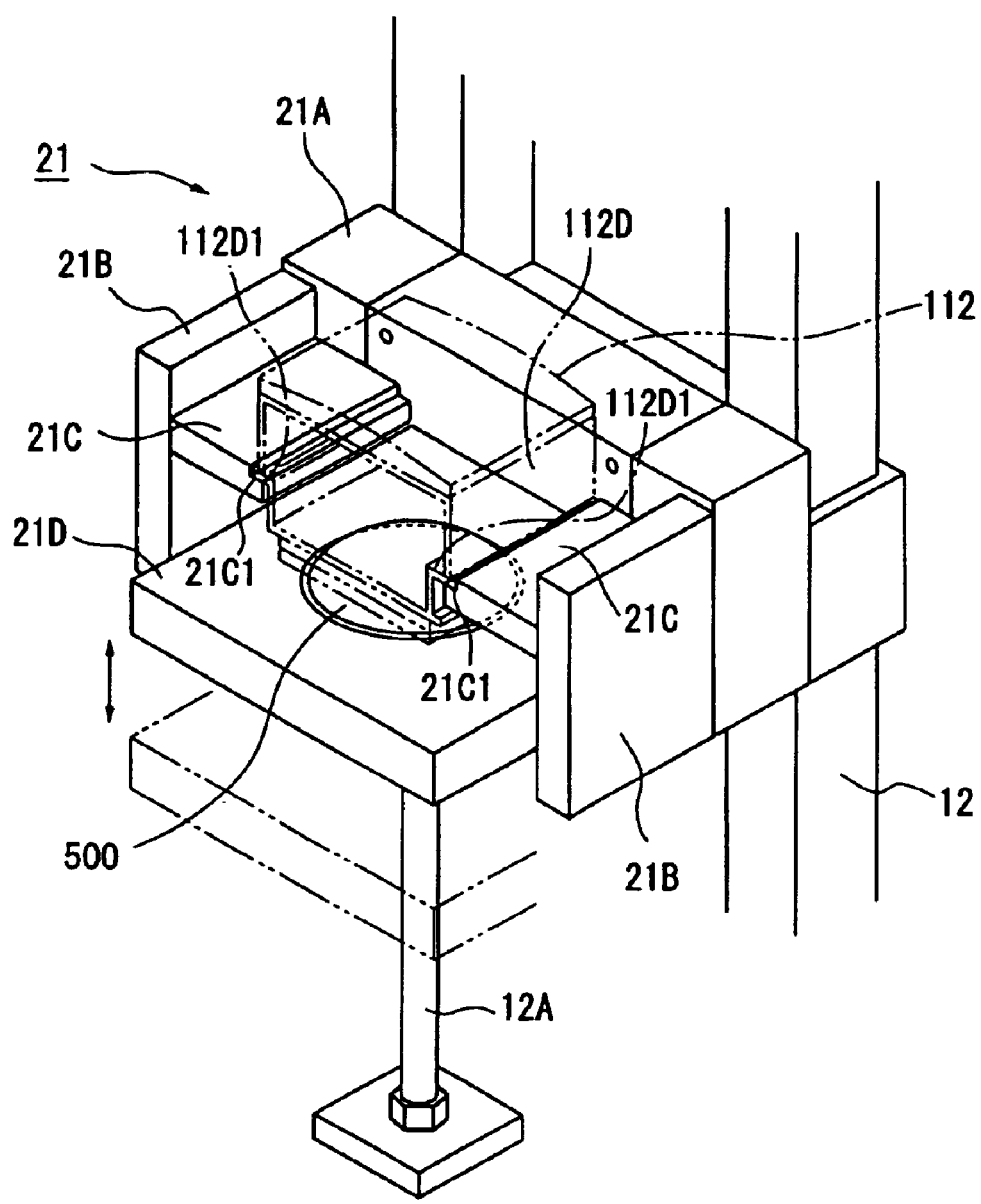
FIG. 10 is a view for explaining an installed state of the illumination optical unit according to the above exemplary embodiment.

FIG. 10 shows the holding-frame holder as seen from the front side.

The holding-frame holder 21 is fixed to the rail 12A of the supporter 12 so as to be able to slide vertically, and holds the holding frame 112D.

Further, the holding-frame holder 21 is connected via an air tube to the pneumatic part 11B (FIG. 4) which is provided inside the base part 11, and introduces air set to a predetermined pressure by the pneumatic part 11B, so that the holding-frame holder 21 slides vertically with respect to the rail 12A.

Moreover, on the ceiling surface of the base part 11 of the manufacturing apparatus 1 of an illumination optical unit, the holding-frame-holder vertical sliding switch SW1 (FIG. 4 and FIG. 5) is provided, and the holding-frame-holder vertical sliding switch SW1 switches the introduction of air from the pneumatic part 11B to the holding-frame holder 21.

The holding-frame holder 21 includes a sliding portion 21A fixed to the rail 12A of the supporter 12 so as to be able to slide vertically, extended portions 21B formed so as to be orthogonal to the end face of the sliding portion 21A and to extend vertically therefrom, grip portions 21C formed so as to extend in a horizontal direction from the end faces of the extended portions 21B, and a superposing lens installing portion 21D formed so as to be orthogonal to the end face of the sliding portion 21A and to extend in a horizontal direction therefrom.

Among those, at the tip portions of the grip portions 21C, gripping surfaces 21C1 are formed to have a substantial L-shape cross sections in order to engage the engagement portions 112D1 of the holding frame 112.

The superposing lens installing portion 21D is located below the holding-frame holder 21 and installs a superposing lens 500 similar to the superposing lens 113 of the projector 100. When the illumination optical unit 112 is gripped by the grip portions 21C, a relative position between the illumination optical unit 112 and the superposing lens 500 installed in the superposing lens installing portion 21D becomes approximately equal to a designed position of the illumination optical unit 112 and the superposing lens 113 in the projector 100. By such constitution, the optimal illumination optical unit 112 can be manufactured when incorporated into the projector 100.

The ultraviolet ray shielding cover 22 prevents ultraviolet rays from being dispersed to the outside, which are irradiated from the ultraviolet ray irradiator 70 via a ray irradiating part installed in the position adjustor 30. The ultraviolet ray shielding cover 22 is formed in a substantially box-shape so as to surround a portion extending from a lower end of the position adjustor 30 to the superposing lens installing portion 21D. Further, the front side (the left side in FIG. 5) of the ultraviolet ray shielding cover 22 is formed to be able to be opened/closed in the horizontal direction such that the installation of the illumination optical unit 112 can be installed in the holding-frame holder 21 which is located inside the ultraviolet ray shielding cover (see FIG. 4).

Figure 11:
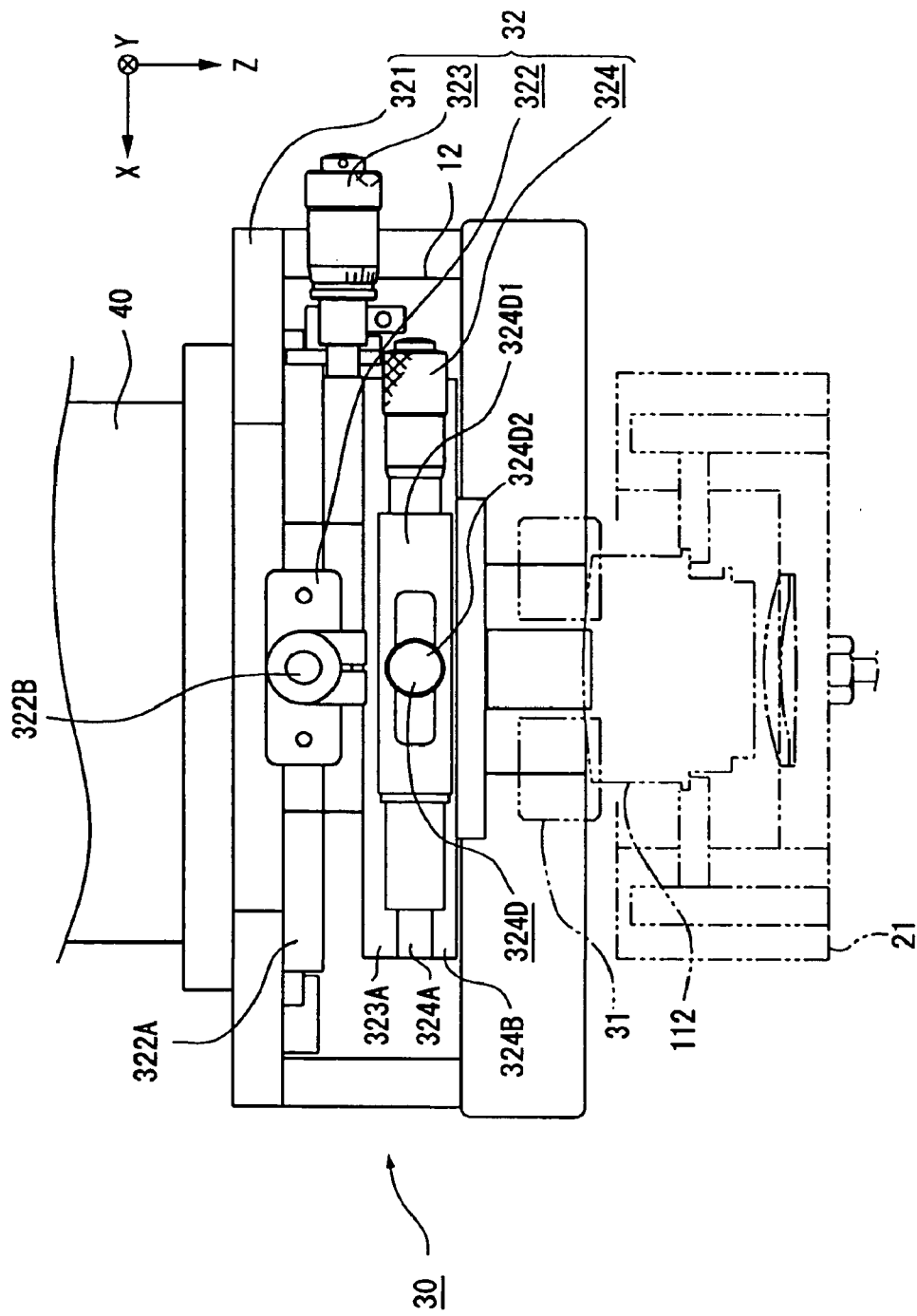
FIG. 11 is a front view showing a position adjustor according to the above exemplary embodiment.
Figure 12:
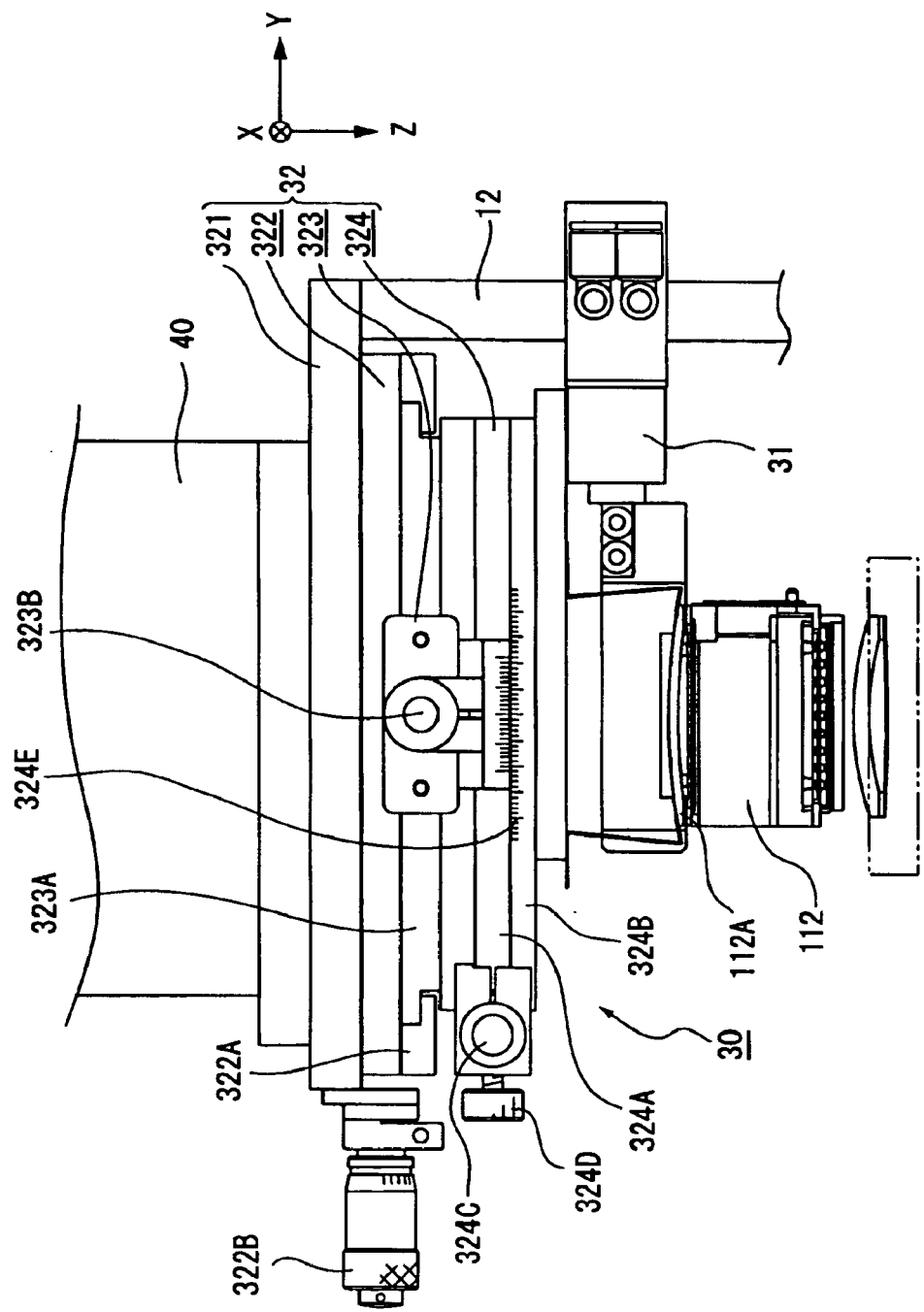
FIG. 12 is a side view showing the position adjustor according to the above exemplary embodiment.

FIG. 11 shows the position adjustor as seen from the front. FIG. 12 shows the position adjustor as seen from the lateral side. Incidentally, as shown in FIGS. 11 and 12, the optical axis of the illumination optical unit 112 is set as Z-axis and two mutually orthogonal axes orthogonal to the Z-axis are set as X and Y-axes.

The position adjustor 30 performs a position adjustment of the first lens array 112 of the illumination optical unit 112 on the basis of various information which are image-processed by the PC main body 62 and displayed on the display device 61. The position adjustor 30 is configured to include a beam splitting element pincher 31 as a beam-splitting-element holding member, and an adjustor main body 32.

Figure 13:
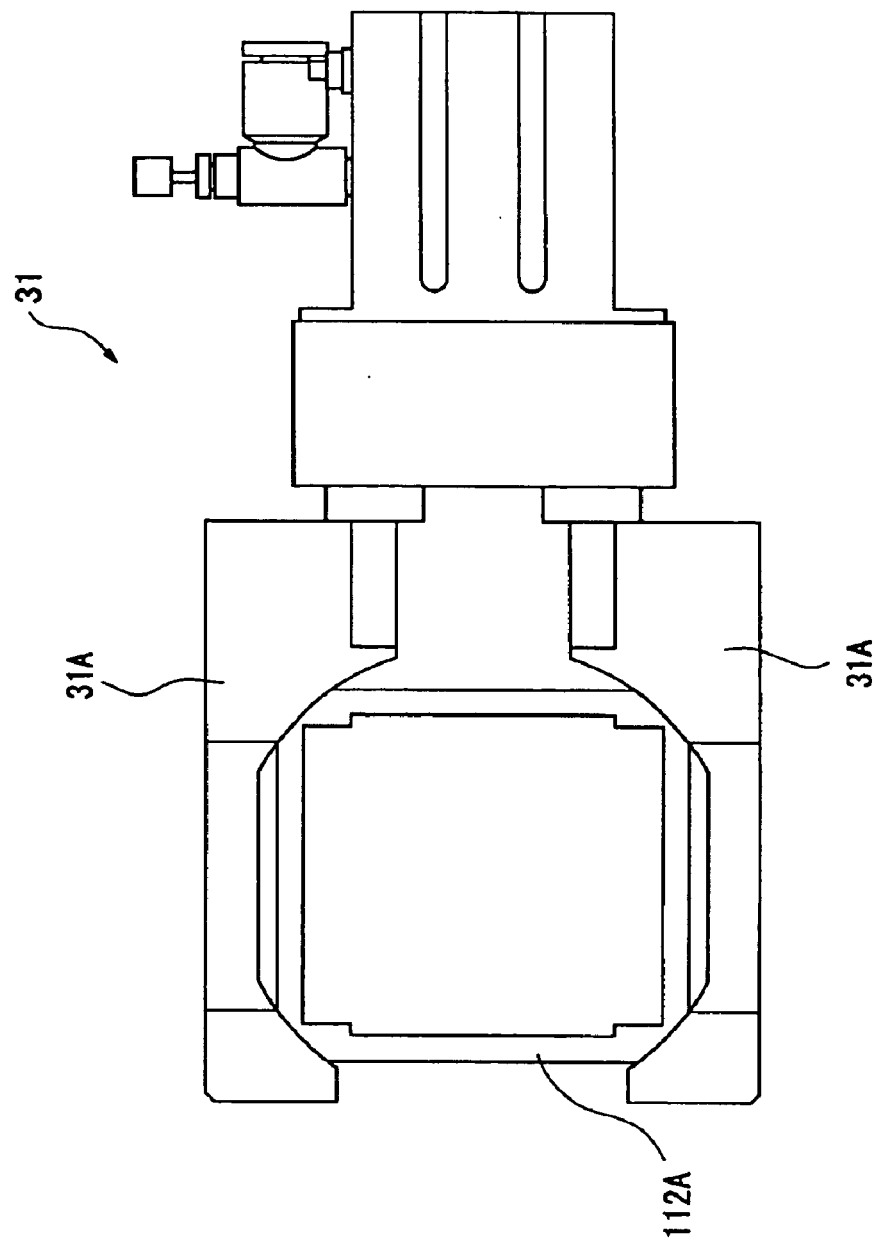
FIG. 13 shows a beam splitting element pincher according to the above exemplary embodiment, as seen from the top.

FIG. 13 shows the beam splitting element pincher as a beam splitting element holding member as seen from the top.

The beam splitting element pincher 31 is located below the adjustor main body 32 and installed at an adjustment position of the first lens array 112A. Also, the beam splitting element pincher 31 pinches the first lens array 112A which is closely adhered via an ultraviolet-ray curing adhesive in the light entering-side end face of the holding frame 112D of the illumination optical unit 112. That is, the beam splitting element pincher 31 pinches the first lens array 112A, when the holding-frame holder 21 slides up and is set at an adjusted position of illumination optical unit 112.

The beam splitting element pincher 31 has two clamping portions 31A on which pinching surfaces substantially equal to the outer peripheral shape of the first lens array 112A is formed, and pinches the first lens array 112A so as to pinch an outer peripheral portion of the first lens array 112A with the clamping portions 31A from the horizontal direction (the top and bottom direction in FIG. 13). The clamping portions 31A are connected with the pneumatic part 11B by an air tube (FIG. 4), and introduces air with a predetermined pressure by the pneumatic part 11B, so that the two clamping portions 31A closely approach each other to pinch the outer periphery of the first lens array 112A.

Also, on the ceiling surface of the base part 11 of the manufacturing apparatus 1 of an illumination optical unit, a clamp switch SW2 is provided, and the clamp switch SW2 switches the introduction of air from the pneumatic part 11B to the clamping portions 31A.

Further, the beam splitting element pincher 31 is mechanically connected to a Y-axis position adjustor 322, an X-axis position adjustor 323 and an in-plane rotational position adjustor 324 for the adjustor main body 32, which will be described later. For such connection, the adjustment of the adjustor main body 32 moves the beam splitting element pincher 31 over a plane, and in cooperation with this, the first lens array 112A moves with respect to the beam entering end face of the holding frame 112D.

As shown in FIG. 11 and FIG. 12, the adjustor main body 32 performs a position adjustment of the beam splitting element pincher 31 on a plane orthogonal to the illumination optical axis. The adjustor main body 32 is configured to include an adjustor main body base portion 321, the Y-axis position adjustor 322, the X-axis position adjustor 323 and the in-plane rotational position adjustor 324.

The adjustor main body base portion 321 is located above the adjustor main body 32 and fixed to the supporter 12 to support the adjustor main body 32.

As shown in FIG. 11, the Y-axis position adjustor 322 engages a lower end of the adjustor main body base portion 321, and includes a Y-axis slide plate 322A capable of sliding in the direction of Y axis, and a Y-axis direction adjusting knob 322B for causing the Y-axis slide plate 322A to slide in the direction of Y axis. Specifically, the Y-axis slide plate 322A is mechanically connected to the beam splitting element pincher 31 via the X-axis position adjustor 323 and the in-plane rotational position adjustor 324, and the Y-axis slide plate 322A slides in the direction of Y axis, so that the beam splitting element pincher 31 moves in the direction of Y axis in cooperation with this.

As shown in FIG. 12, the X-axis position adjustor 323 engages a lower end of the Y-axis slide plate 322A of the Y-axis position adjustor 322, and includes an X-axis slide plate 323A capable of sliding in the direction of X axis, and an X-axis direction adjusting knob 323B for causing the X-axis slide plate 323A to slide in the direction of X axis. Specifically, the X-axis slide plate 323A is mechanically connected via the in-plane rotational position adjustor 324 to the beam splitting element pincher 31, and the X-axis slide plate 323A slides in the direction of X axis, so that the beam splitting element pincher 31 moves in the direction of X axis in cooperation with this.

As shown in FIG. 12, the in-plane rotational position adjustor 324 includes an in-plane rotational position adjustment base portion 324A mechanically fixed to a lower end of the X-axis slide plate 323A of the X-axis position adjustor 323, an in-plane rotating and sliding plate 324B mechanically engaging a lower end of the in-plane rotational position adjustment base portion 324A and capable of rotating and sliding about the Z axis, an in-plane rotation adjusting knob 324C for causing the in-plane rotating and sliding plate 324B to rotate and slide in the in-plane direction with respect to the in-plane rotational position adjustment base portion 324A, and a position fixing portion 324D for fixing the positions of the in-plane rotational position adjustment base portion 324A and the in-plane rotating and sliding plate 324B. Also, the in-plane rotating and sliding plate 324B is mechanically connected to the beam splitting element pincher 31, and the in-plane rotating and sliding plate 324B rotates and slides in the in-plane direction with respect to the in-plane rotational position adjustment base portion 324A, so that the beam splitting element pincher 31 moves in the in-plane direction in cooperation with this.

Among those, the position fixing portion 324D, as shown in FIG. 11, includes a loose hole forming portion 324D1 which is fixed to the in-plane rotational position adjustment base portion 324A and has therein a loose hole formed to extend in a horizontal direction, and an engagement knob 324D2 which is fitted into the loose hole formed in the loose hole forming portion 324D1 and engages the in-plane rotating and sliding plate 324B. That is, the relaxing of the engagement knob 324D2 and the releasing of an engaged state to the in-plane rotating and sliding plate 324B enable the in-plane rotating and sliding plate 324B to rotate and slide in the in-plane direction with respect to the in-plane rotational position adjustment base portion 324A.

Further, as shown in FIG. 12, a rotation adjusting gradations 324E is formed to span over the in-plane rotational position adjustment base portion 324A and the in-plane rotating and sliding plate 324B. Then, an operator sees the rotation adjusting gradations 324E, so that he can recognize the position of rotational direction of the in-plane rotating and sliding plate 324B with respect to the in-plane rotational position adjustment base portion 324A.

Moreover, although specific illustration is omitted, an opening is formed on the illumination optical axis of the position adjustor 30 to transmit beams from the illuminator 40.

Referring back to FIG. 4 and FIG. 5, the illuminator 40 is located in the upper side of the manufacturing apparatus 1 of an illumination optical unit, and supplies collimated beams to the illumination optical unit 112 which is a target for adjustment. The illuminator 40 includes a light source unit 41 and a barrel portion 42.

The light source unit 41 includes a light source lamp 411 received within a casing. For example, a tungsten lamp, halogen lamp, metal halide lamp or high-pressure mercury lamp are often used as the light source lamp 411.

The barrel portion 42 is provided to a barrel-shaped tip portion thereof with a collimating lens 421.

In such illuminator 40, diffused beams emitted from the light source lamp 411 are collimated by the collimating lens 421 at the tip portion of the barrel portion 42 and are emitted as collimated beams to the outside of the illuminator 40.

Manufacturing Method of an Illumination Optical Unit

Figure 14:
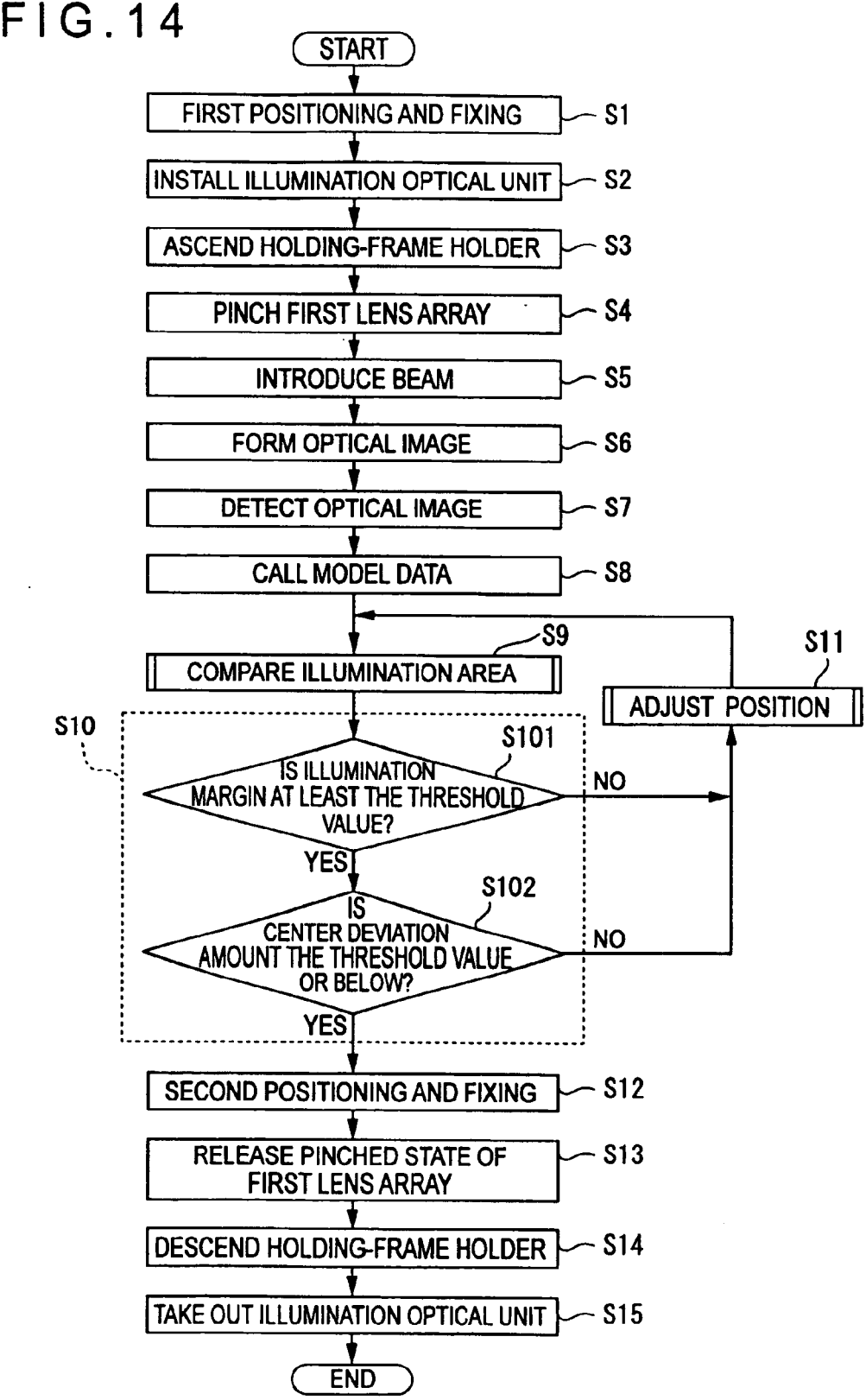
FIG. 14 is a flowchart for explaining the operation of manufacturing an illumination optical unit according to the above exemplary embodiment.

FIG. 14 is a flowchart for explaining the operation of manufacturing an illumination optical unit.

Next, a manufacturing method of the illumination optical unit 112 by the above-mentioned manufacturing apparatus 1 of an illumination optical unit will be described with reference to the FIG. 4 to FIG. 13, and a flowchart of FIG. 14.

(A) First, at the light emitting-side end face of the holding frame 112D, the second lens array 112B and the PBS array 112C are adjusted on the basis of their outer appearances and these optical elements are positioned and fixed (first positioning and fixing process: step S1). Moreover, the fixation device that it is not limited to an ultraviolet-ray curing adhesive, may include the use of a thermo-setting type adhesive.

(B) After step S1, the first lens array 112A is brought in close contact with the light entering-side end face of the holding frame 112D via the ultraviolet-ray curing adhesive. Then, the ultraviolet-ray shielding cover 22 of the illumination optical unit installer 20 is opened, and the holding frame 112D having the first lens array 112A brought in close contact therewith is installed in the holding-frame holder 21 of the illumination optical unit installer 20 (step S2). Further, after such installation, the ultraviolet-ray shielding cover 22 is closed and made airtight. Specifically, the engagement portion 112D1 of the holding frame 112D is installed to abut the gripping surfaces 21C1 of the grip portion 21C in the holding-frame holder 21.

(C) In step S2, after the holding frame 112D is installed in the holding-frame holder 21, the holding-frame holder 21 is ascended and set in an adjusted position of the first lens array 112A (step S3). Specifically, the holding-frame-holder vertical sliding switch SW1 provided in the manufacturing apparatus 1 is manipulated, so that the air set to a predetermined pressure in the pneumatic part 11B is introduced to the holding-frame holder 21 to cause the holder to slide up with respect to the rail 12A.

(D) In step S3, when the holding-frame holder 21 has been ascended and set in an adjusted position, the beam splitting element pincher 31 of the position adjustor 30 pinches the outer periphery of the first lens array 112A (step S4). Specifically, the clamp switch SW2 provided in the manufacturing apparatus 1 is manipulated, so that an air set to a predetermined pressure in the pneumatic part 11B is introduced to the beam splitting element pincher 31. Then, the two clamping portions 31A of the beam splitting element pincher 31 closely approach each other to pinch the outer periphery of the first lens array 112A.

(E) The light source lamp 411 of the illuminator 40 is driven and the collimated beams are introduced to the illumination optical unit 112 (beam introducing process: step S5).

(F) In step S5, when beams are introduced, they pass through the illumination optical unit 112, and through the superposing lens 500 installed in the superimposing-lens installing portion 21D, to form an optical image of beams on the projection screen 14 (optical image forming process: step S6).

(G) In step S6, the CCD camera 50 detects the optical image including the criterial frame 14A formed on the projection screen 14. Then, the CCD camera 50 converts the detected optical image into electrical signals to output the signals to the PC 60 (optical image detecting process: step S7).

(H) The PC main body 62 is manipulated, and model data of a projector corresponding to a combination of the current illumination optical unit 112 (the first lens array 112A, the second lens array 112B and the PBS array 112C) are called (step S8).

As the model data, data on the dimension of an image forming area of the liquid crystal panel 141 and the number of scanning lines for specifying an illumination area, threshold value data on an optimal range of the amount of margin in comparing the illumination area, threshold value data on an optimal range of the amount of center deviation in comparing the illuminating area, or etc are called. Moreover, such data can be set by a user or the like, and stored as, for example, a text file.

(I) The PC main body 62 acquires electrical signals outputted from the CCD camera 50. Then, the body performs an image processing of an optical image based on the electrical signals, compares the criterial frame image 201 (FIG. 8) with an illumination area of the optical image 200 (FIG. 8) based on beams through the illumination optical unit 112, and displays various processing information on the display device 61 (illumination area comparing process: step S9).

Specifically, the illumination-area comparing step S9 is carried out according to the following procedure.

Figure 15:
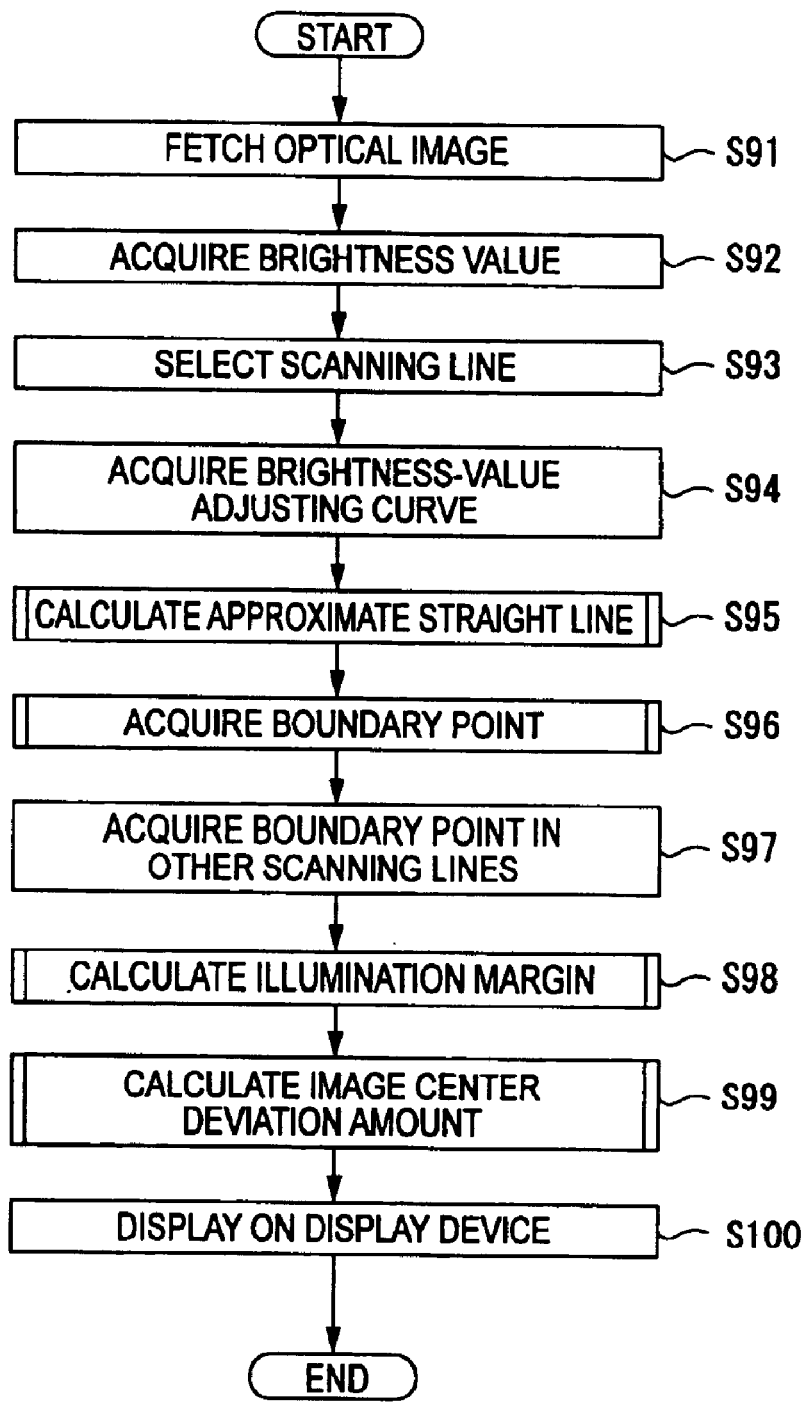
FIG. 15 is a flowchart for explaining the procedure of an illumination-area comparing step according to the above exemplary embodiment.

FIG. 15 is a flowchart for explaining the procedure of illumination area comparing process.

(I-1) First, the image fetcher 63 of the PC main body 62 fetches electrical signals outputted from the CCD camera 50, and converts the electrical signals into image signals readable by the image processor 64, to output the image signals (image fetching step: step S91).

(I-2) Next, the brightness value acquisitor 65A of the image processor 64 acquire the image signals, divides the brightness value of the optical image 200 (FIG. 8) into 256 gradations ranging from 0 to 255 on the basis of the acquired image signals, to acquires the gradation in units of pixels (brightness-value acquiring step: step S92).

(I-3) Next, the scanning line selector 65B selects one transverse scanning line among transverse scanning lines in the transverse direction set to extending inside and outside the illumination area LA of the fetched optical image 200 (scanning-line selecting step: step S93). Specifically, as shown in FIG. 9(A), one transverse scanning line SL1 is selected among the transverse scanning lines SL set to extending inside and outside the illumination area LA of the optical image 200, from the left end to the central portion of the optical image 200.

(I-4) Next, the brightness-value adjusting curve acquisitor 65C acquires the brightness-value adjusting curve 300 showing the change of brightness value (gradation) in accordance with pixel position on the transverse scanning line SL1 selected in step S93 (brightness-value adjusting-curve acquiring step: step S94). Specifically, as shown in FIG. 9(B), a brightness-value adjusting curve 300 is acquired where the transverse axis (X-axis) as a pixel position on a scanning line and the longitudinal axis (Y-axis) as the gradation of brightness value are plotted, respectively, on an XY coordinates.

As shown in FIG. 9(B), the acquired brightness-value adjusting curve 300 is acquired in a crank shape or S shape from the outside to the central portion of the optical image 200, in a boundary portion of the illumination area LA of the optical image 200. In other words, the brightness-value adjusting curve 300 consists of a reference section 301 having a gradation of about 0 and shown outside of the illumination area LA, an illumination section 302 which is inside of the illumination area LA having about 255 gradations and showing an appropriate illumination area, and a brightness-value adjusting section 303 therebetween.

Incidentally, when the brightness-value adjusting curve departs from the central portion of the illumination area of the optical image to the outside of the optical image, a brightness-value adjusting curve of reversely-arranged crank shape or reversely-arranged S shape as compared to the above is acquired. Vertical scanning line is acquired in the same manner by converting the vertical and horizontal directions.

Figure 16:
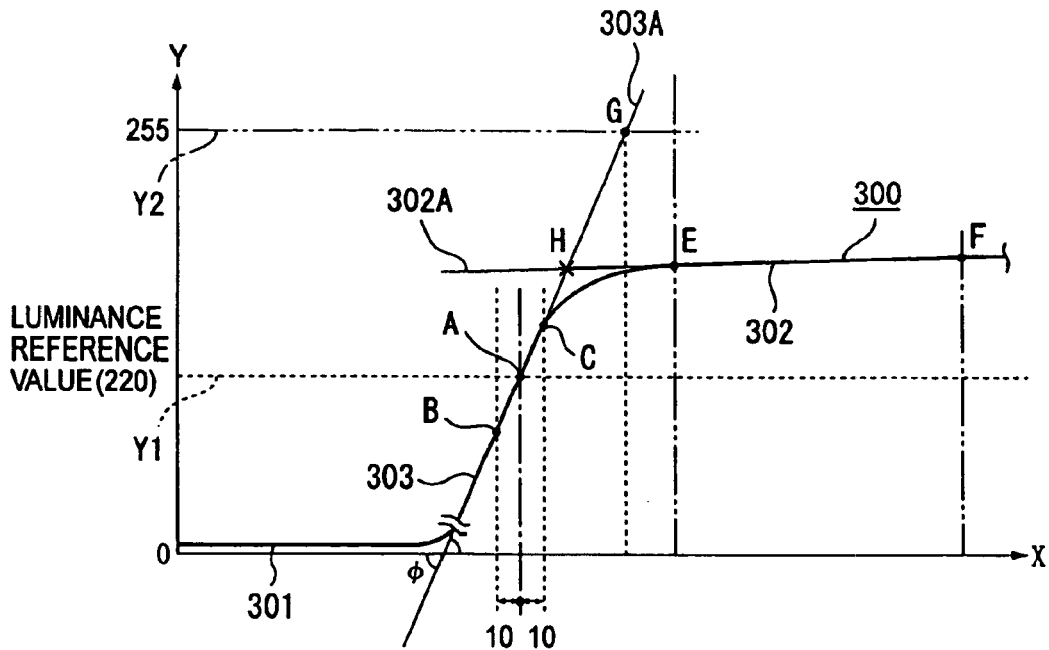
FIG. 16 shows, on an enlarged scale, a portion of the brightness-value adjusting curve according to the above exemplary embodiment.

FIG. 16 shows, on an enlarged scale, a portion of the brightness-value adjusting curve 300 in FIG. 9(B).

(I-5) Next, the approximate straight line calculator 65D approximates the brightness-value adjusting section 303 as a straight line, and calculates an approximate straight line (approximate-straight-line calculating step: step S95). Specifically, an approximate straight line is calculated on the basis of the flowchart shown in FIG. 17.

Figure 17:
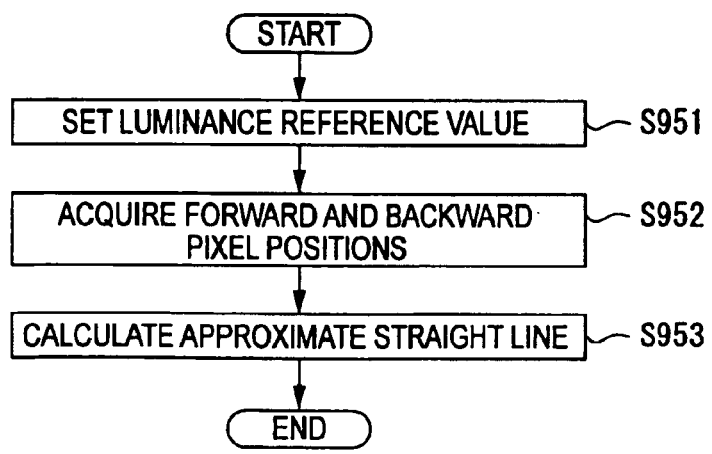
FIG. 17 is a flowchart for explaining an approximate-straight-line calculating step according to the above exemplary embodiment.

(I-5-1) Next, as shown in FIG. 16 and FIG. 17, a luminance reference value used as a reference is set which serves as a portion with a high linearity in the brightness-value adjusting section 303, for example, a gradation of 220 (step S951).

(I-5-2) Next, the coordinates of an intersection point A are acquired between a 220 gradation line Y1 showing a gradation of 220 and the brightness-value adjusting section 303. Then, points B and C indicating the pixel positions which are 10 pixels away before and after X coordinate of the intersection point A (step S952).

(I-5-3) Next, the brightness-value adjusting section 303 between the points B and C is approximated as a straight line on the basis of the coordinates of the acquired points B and C, i.e., the pixel positions of the points B and C and the gradation for those pixel positions, and an changing-section approximate straight line 303A is calculated (step S953).

(I-6) Next, as shown in FIG. 15 and FIG. 16, the boundary point acquisitor 65E acquires a boundary point H of the illumination area LA of the optical image 200 on the basis of the changing-section approximate straight line 303A (boundary point acquiring step: step S96). Specifically, the boundary point H is acquired on the basis of the flowchart shown in FIG. 18.

Figure 18:
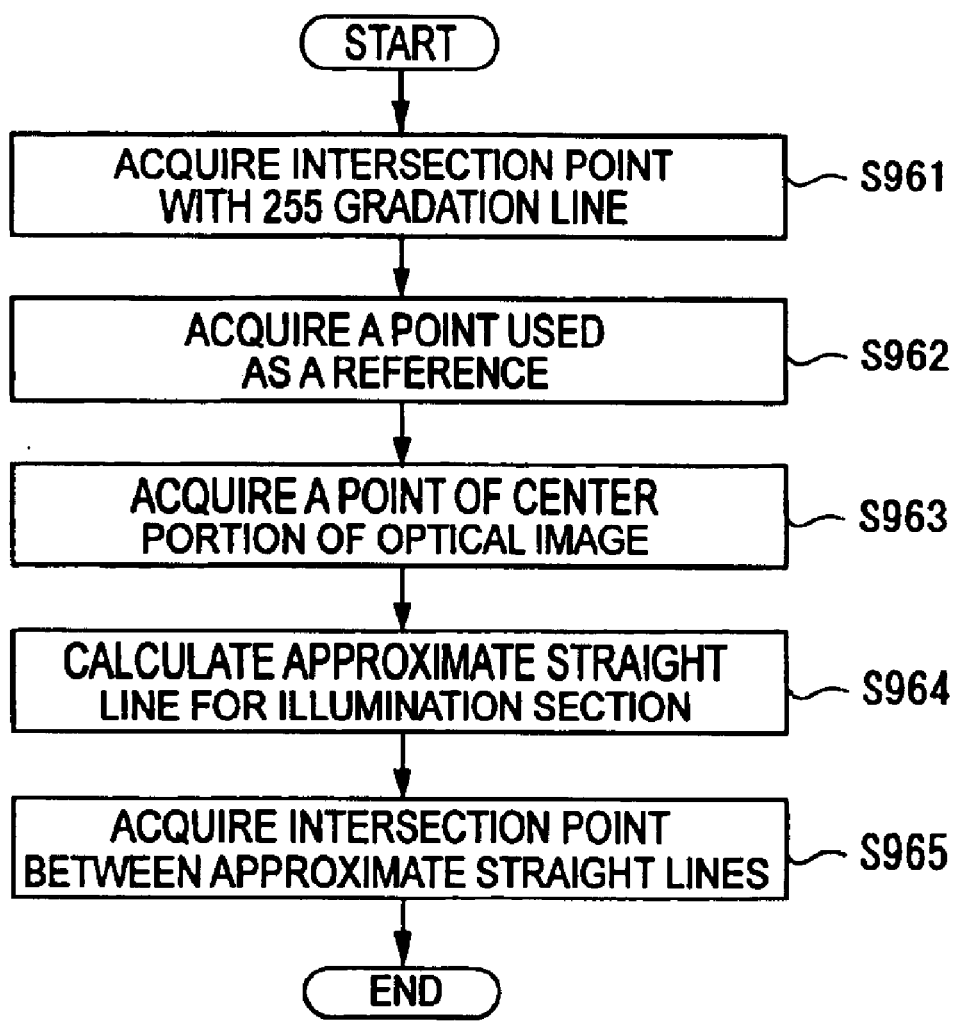
FIG. 18 is a flowchart for explaining a boundary-point acquiring step according to the above exemplary embodiment.

(I-6-1) As shown in FIG. 16 and FIG. 18, an intersection point G between the changing-section approximate straight line 303A and a 255 gradation line Y2 is acquired (step S961).

(I-6-2) A point E used as a reference on the illumination section 302 in a pixel position which is shifted by a predetermined number of pixels, for example, by 50 pixels from the intersection point G toward the central side of the optical image 200 is acquired (step S962).

(I-6-3) Next, a point F is acquired on the illumination section 302 in a pixel position to be a substantial center of the optical image 200 (step S963).

(I-6-4) The illumination section 302 between the points E and F is approximated as a straight line on the basis of the coordinates of the points E and F, i.e., the pixel positions and the gradation of pixel positions of the points E and F, and an illumination-section approximate straight line 302A is calculated (step S964).

(I-6-5) Next, the intersection point H between the calculated changing-section approximate straight line 303A and the illumination-section approximate straight line 302A is acquired (step S965). Thus, the acquired intersection point H is a boundary point.

(I-7) After all of the boundary points H for the left transverse scanning lines SL1 are acquired in such procedure, the boundary points H are also acquired in the same procedure for right transverse scanning lines and for upper and lower longitudinal scanning lines (step S97). At this time, in the scanning-line selecting step S93, the predetermined number of scanning lines SL is selected from right, left, upper and lower of the illumination area LA on the basis of data regarding the number of scanning lines to be selected as one of type data called in step S8. The boundary point H on the left and right sides of the illumination area LA may be acquired by a single scanning line spanning over the left and right ends of the illumination area, or alternatively, the boundary point H on the upper and lower sides of the illumination area LA may be acquired by a single line spanning between the upper end and lower end of the illumination area.

(I-8) Next, the illumination margin calculator 65F calculates an illumination margin M of the illumination area LA of the optical image 200 with respect to the criterial frame image 201, on the basis of the pixel positions of the criterial frame image 201 and the boundary points H acquired in step S96 (illumination-margin calculating step: step S98). Specifically, the illumination margin M is calculated on the basis of the flowchart shown in FIG. 19.

Figure 20:
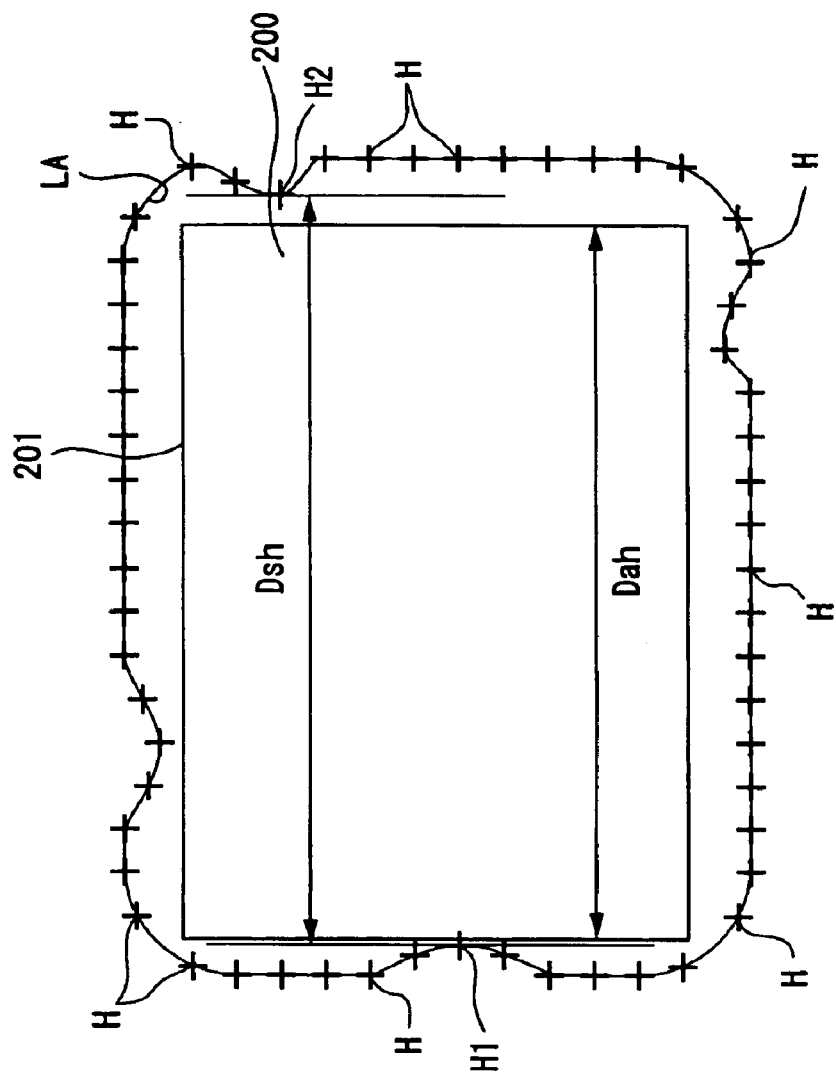
FIG. 20 is a view for explaining the procedure of calculating a horizontal margin in the illumination-margin calculating step according to the above exemplary embodiment.
Figure 21:
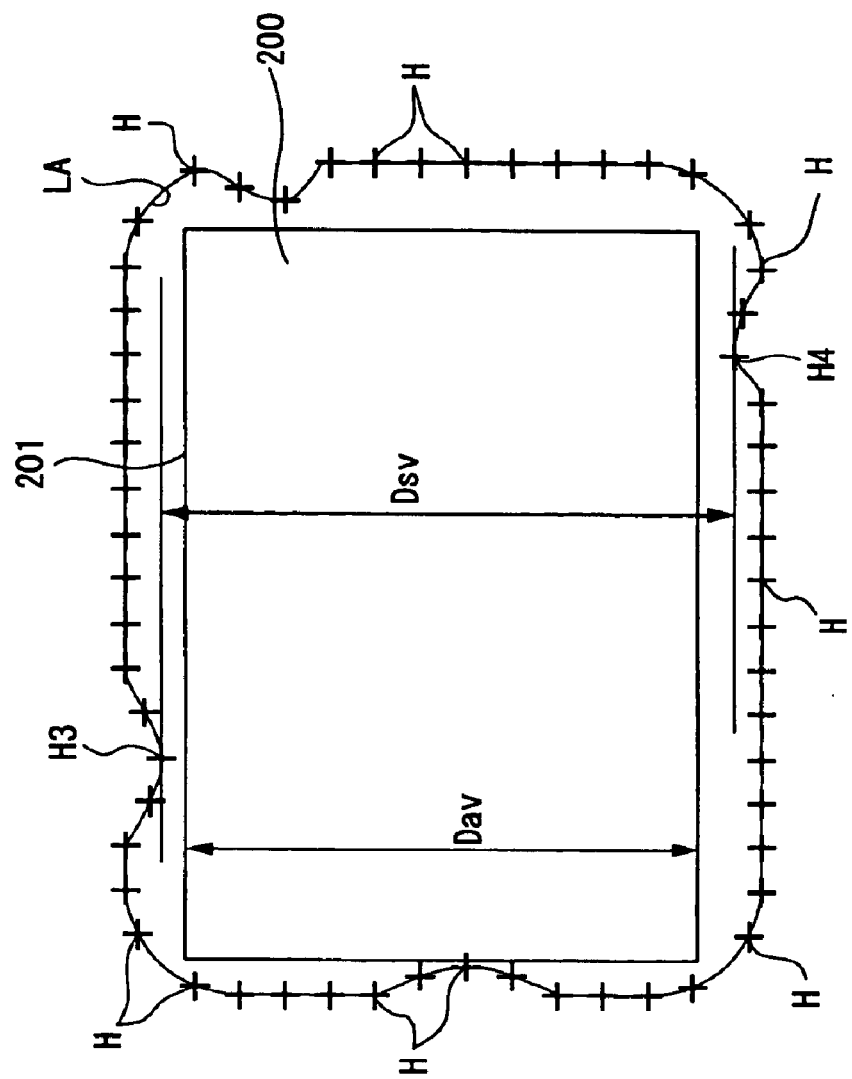
FIG. 21 is a view for explaining the procedure of calculating a vertical margin in the illumination-margin calculating step according to the above exemplary embodiment.

FIG. 20 illustrates a method of calculating a horizontal margin. FIG. 21 illustrates a method of calculating a vertical margin.

Figure 19:
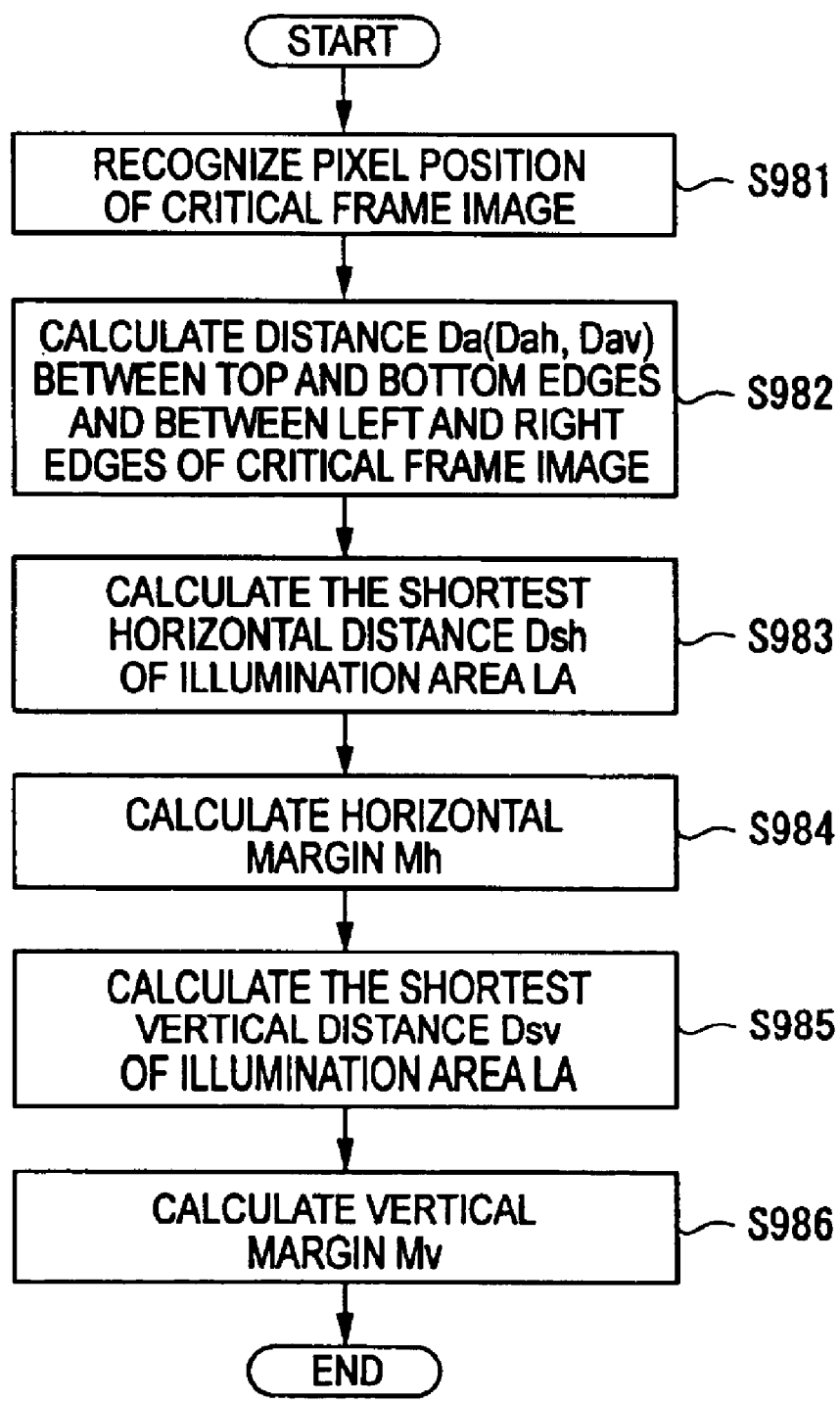
FIG. 19 is a flowchart for explaining an illumination-margin calculating step according to the above exemplary embodiment.

First, the step of calculating a vertical and horizontal margin by the illumination margin calculator 65F will be described with reference to the flowchart shown in FIG. 19 and FIG. 20.

(I-8-1) The illumination margin calculator 65F recognizes pixel positions of the criterial frame image 201 from the brightness values acquired in the brightness-value acquiring step S92 (step S981).

(I-8-2) A distance Dah between the left and right edges of the criterial frame image 201 and a distance Dav between top and bottom edges, i.e. a distance Da between horizontal and vertical opposing edges of the criterial frame image 201, are calculated from the coordinates of the recognized pixel positions (step S982).

(I-8-3) Further, the illumination margin calculator 65F calculates the shortest distance Dsh between the most-right boundary point H1 along the left edge of the criterial frame image 201 and most-left boundary point H2 along the right edge thereof, among the boundary points H acquired by the boundary point acquisitor 65E (step S983). That is, the shortest distance Dsh corresponds to the distance of the illumination area LA in a direction orthogonal to horizontal edges of the criterial frame image 201.

(I-8-4) Then, the illumination margin calculator 65F calculates a horizontal margin Mh according to the following Expression (2), on the basis of the distance Dah calculated in step S982 and the distance Dsh calculated in step S983 (step S984).

$$Mh=(Dsh-Dah)/2 \qquad (2)$$

(I-8-5) Next, as shown in FIG. 21, the illumination margin calculator 65F calculates the minimum distance Dsv between the lowermost boundary point H3 among the boundary points H along the upper edge of the criterial frame image 201 and the uppermost boundary point H4 among the boundary points H along the lower edge of the criterial frame image 201 (step S985). In other words, the minimum distance Dsv corresponds to the narrowest distance of the illumination area LA in a direction orthogonal to the upper and lower edges of the criterial frame image 201.

(I-8-6) Then, the illumination margin calculator 65F calculates a vertical margin Mv according to the following Expression (3) on the basis of the distance Dav calculated during the step S982 and the distance Dsv calculated during the step S985 (step S986).

$$Mv=(Dsv-Dav)/2 \qquad (3)$$

Incidentally, when the result of the calculation of the horizontal margin Mh and the vertical margin Mv becomes minus value, the margins may be re-calculated. Further, when the result of the calculation of the horizontal margin Mh and the vertical margin Mv becomes minus value, following arrangement may be employed. For instance, the illumination margin calculator 65F transmits information indicating malfunction of the illumination optical unit 112 of which position is currently adjusted to the display control means 67. The display control device 67 displays a message indicating malfunction of the currently-producing illumination optical unit 112 on the display device 61.

Figure 22:
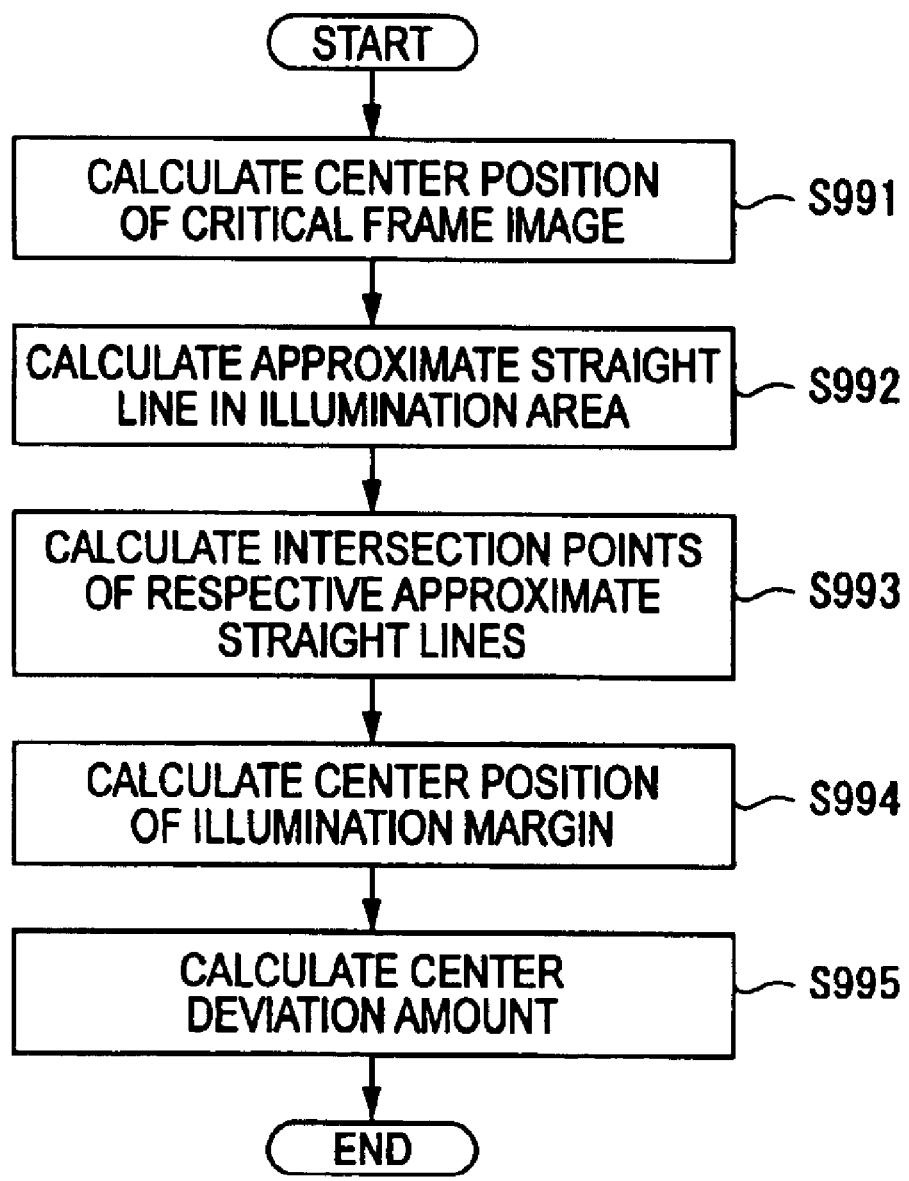
FIG. 22 is a flowchart for explaining the procedure of calculating the deviation amount of center positions by an image center deviation amount calculator according to the above exemplary embodiment.

(I-9) Next, the image center deviation amount calculator 65G calculates a center position of the criterial frame image 201 and a substantial center position of the illumination area LA of the optical image 200, and calculates the deviation amount of these center positions as coordinate values (step S99). Specifically, the deviation amount of the center positions is calculated on the basis of the flowchart shown in FIG. 22.

Figure 23:
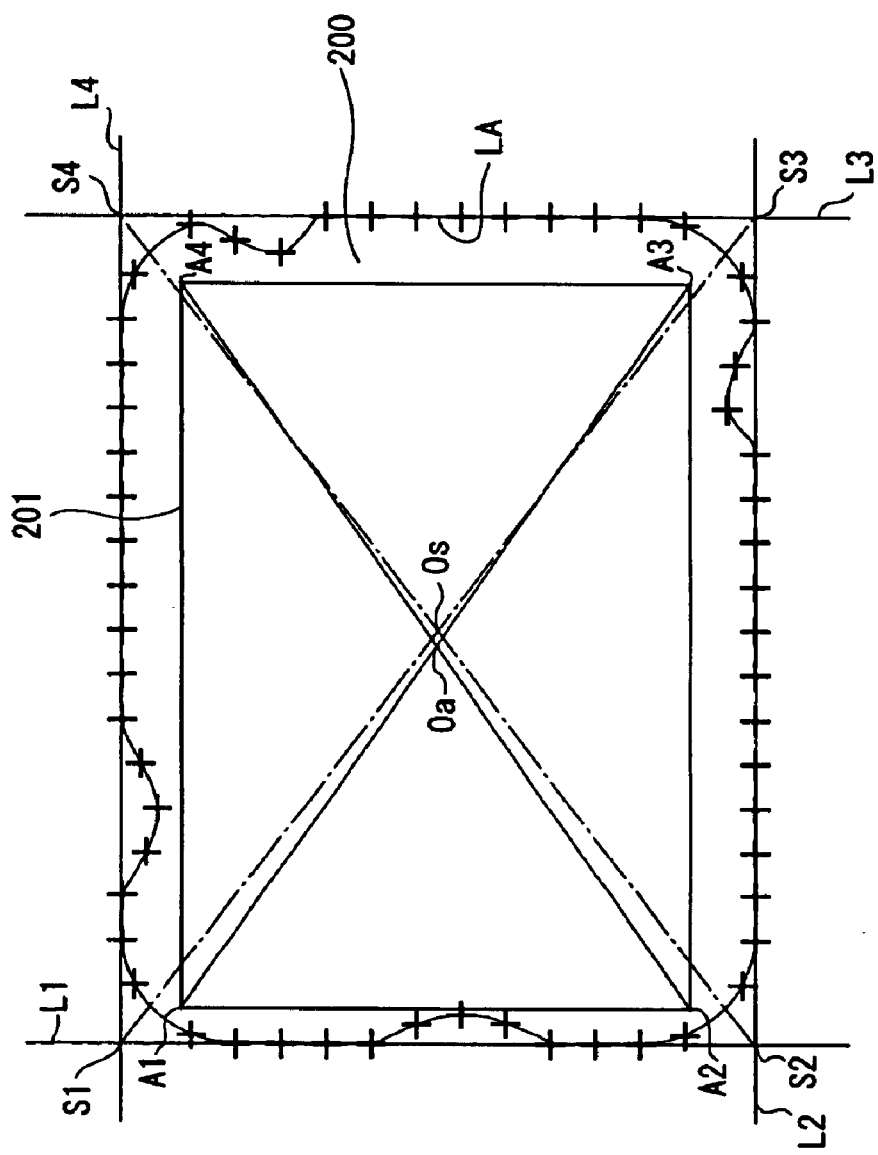
FIG. 23 is a view for explaining the procedure of calculating the deviation amount of the center positions by the image center deviation amount calculator according to the above exemplary embodiment.

FIG. 23 illustrates a method of calculating the deviation amount of the center positions by the image center deviation amount calculator.

(I-9-1) First, the image center deviation amount calculator 65G calculates coordinate values of points A1, A2, A3 and A4 in four corners of the criterial frame image 201 from coordinate values of the pixel positions of the criterial frame image 201. Then, it calculates a coordinate value of a center position Oa of the criterial frame image 201 on the basis of the coordinate values of the points A1, A2, A3 and A4 in the four corners thereof (criterial frame image center position calculating step: step S991).

(I-9-2) Next, the image center deviation amount calculator 65G calculates approximate straight lines L1, L2, L3 and L4 along the respective left, lower, right, and upper edges of the criterial frame image 201 from the boundary points H acquired in step S96 (step S992).

(I-9-3) Further, the image center deviation amount calculator 65G calculates coordinate values of intersection points S1, S2, S3 and S4 of such calculated approximate straight lines L1, L2, L3 and L4 (step S993).

(I-9-4) Moreover, the image center deviation amount calculator 65G calculates a coordinate value of a substantial center position Os of the illumination area LA on the basis of the coordinate values of such calculated approximation intersection points S1, S2, S3 and S4 (optical-image center-position calculating step: step S994).

(I-9-5) Then, the image center deviation amount calculator 65G calculates the deviation amount of the center positions of the criterial frame image 201 and illumination area LA, from a coordinate value of the center position Oa calculated in step S991 and a coordinate value of the center position Os calculated in step S994 (image-center deviation-amount calculating step: S995). Specifically, the image center deviation amount calculator 65G calculates a center deviation amount X from the deviation amount of X coordinates of the center position Os and the center position Oa. Also, it calculates a center deviation amount Y from the deviation amount of Y coordinates of the center position Os and the center position Oa.

Figure 24:
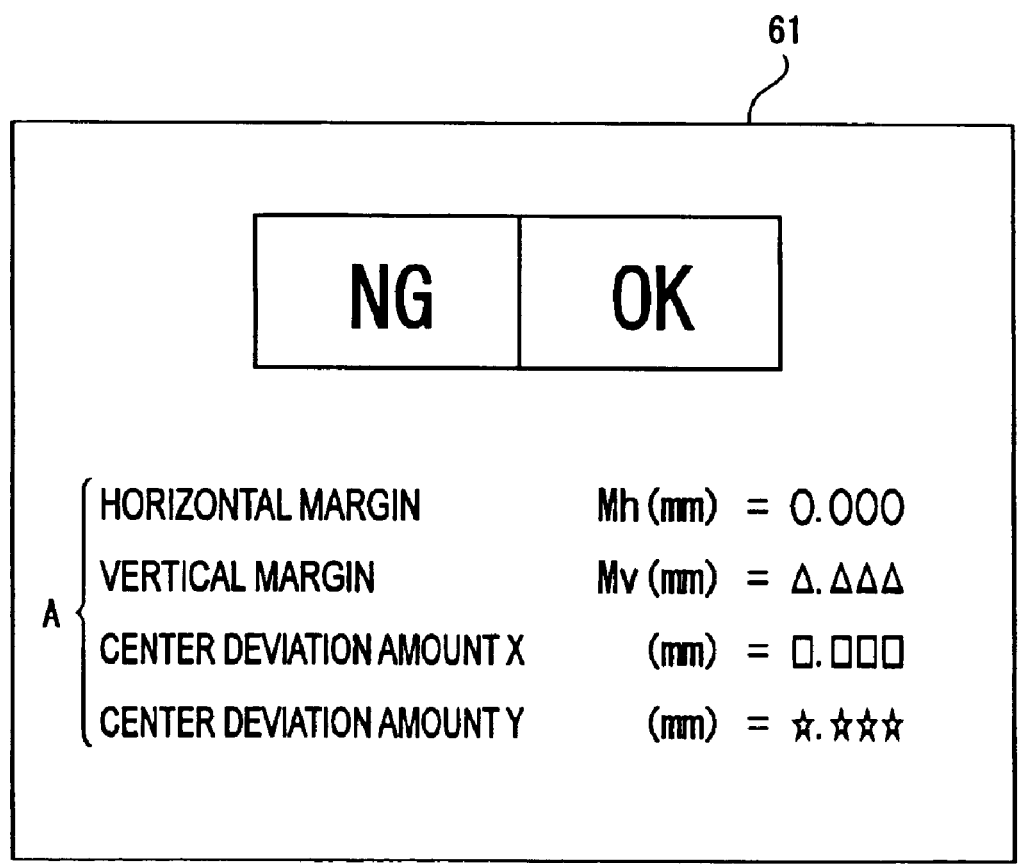
FIG. 24 is a view showing information displayed on the display device by display control device according to the above exemplary embodiment.

(I-10) After calculating the illumination margin in step S98 and calculating the image center deviation amount in step S99, the display control device 67 acquires the horizontal margin Mh, the vertical margin Mv, the center deviation amount X and the center deviation amount Y from the illumination area comparing device 65. Then, the display control device 67 displays the information on the display device 61 (step S100). Specifically, the display control device 67 performs the display of information A on the display device 61, as shown in FIG. 24.

During the steps S983 and S985, the boundary points along vertical and horizontal edges of the criterial frame image 201 are used. The boundary points along vertical and horizontal edges of the criterial frame image 201 may be acquired as follows.

During the illumination-area comparing step S9, among the boundary points H acquired during the boundary-point acquiring step S96, only the boundary point H located within a predetermined range relative to the outer profile of the criterial frame image 201 may be applied to the illumination-margin calculating step S98 and center deviation-amount calculating step S99. Alternatively, during the boundary-point acquiring step S96, when the boundary point H out of a predetermined range relative to the outer profile of the criterial frame image 201 is acquired, the boundary point H may be re-acquired. The predetermined range is set so that singular point acquired clearly on account of abnormality of manufacturing environment during the boundary-point acquiring step S96 can be excluded. In other words, when a singular boundary point H different from desired boundary point is acquired during the boundary-point acquiring step S96, the illumination-margin calculating step S98 and the center deviation-amount calculating step S99 are conducted only by the normally-acquired boundary point H excluding the singular boundary point. Accordingly, even when a singular boundary point such as the one located extremely inside of the criterial frame image as the designed illumination area is found, the illumination margin of the entire illumination area of the optical image relative to the criterial frame image can be securely calculated.

Incidentally, the above-described step S4 may be conducted at any timing before the illumination-area comparing step S9.

(J) Then, the optimal-state determining device 66 of the image processor 64 in the PC main body 62 acquires the illumination margin and the deviation amount of the center positions calculated by the illumination area comparing device 65 in step 9. Further, the optimal-state determining device 66 determines whether the position of the first lens array 112A is located at the optimal position on the basis of the acquired illumination margin and the deviation amount of the center positions (optimal-state determining process: step S10).

Specifically, the optimal-state determining device 66 determines whether the horizontal margin Mh and the vertical margin Mv are at least the threshold values, respectively, on the basis of the threshold value data on the amount of margin called in step S8 (step S101).

If it is determined to be "No (N)" in step S110, the optimal-state determining device 66 outputs determination information to the display control device 67. Then, the display control device 67 causes the character "NG" (see FIG. 24) to be indicated on the display device 61 on the basis of the determination information. In this case, in below described step S11, it is necessary for the operator to perform the position adjustment of the first lens array 112A again.

On the other hand, if it is determined to be "Yes (Y)" in step S101, the optimal-state determining device 66 determines whether the center deviation amount X and the center deviation amount Y are threshold values or below, respectively, on the basis of the threshold value data on the center deviation amount called in step S8 (step S102).

If it is determined to be "N" in step S102, the character "NG" is indicated on the display device 61, similar to step S101. Further, in this case, in below described step S11, it is necessary for the operator to perform the position adjustment of the first lens array 112A again.

On the other hand, if it is determined to be "Y" in step S102, the optimal-state determining device 66 outputs determination information to the display control device 67. Then, the display control device 67 indicates on the character "OK" on the display device 61 on the basis of the determination information (see FIG. 24). That is, the optimal-state determining device 66, if the illumination margin is at least the preset threshold value and the center deviation amount is the preset threshold value or below, determines the position of the first lens array 112A to be in the optimal state.

Figure 25:
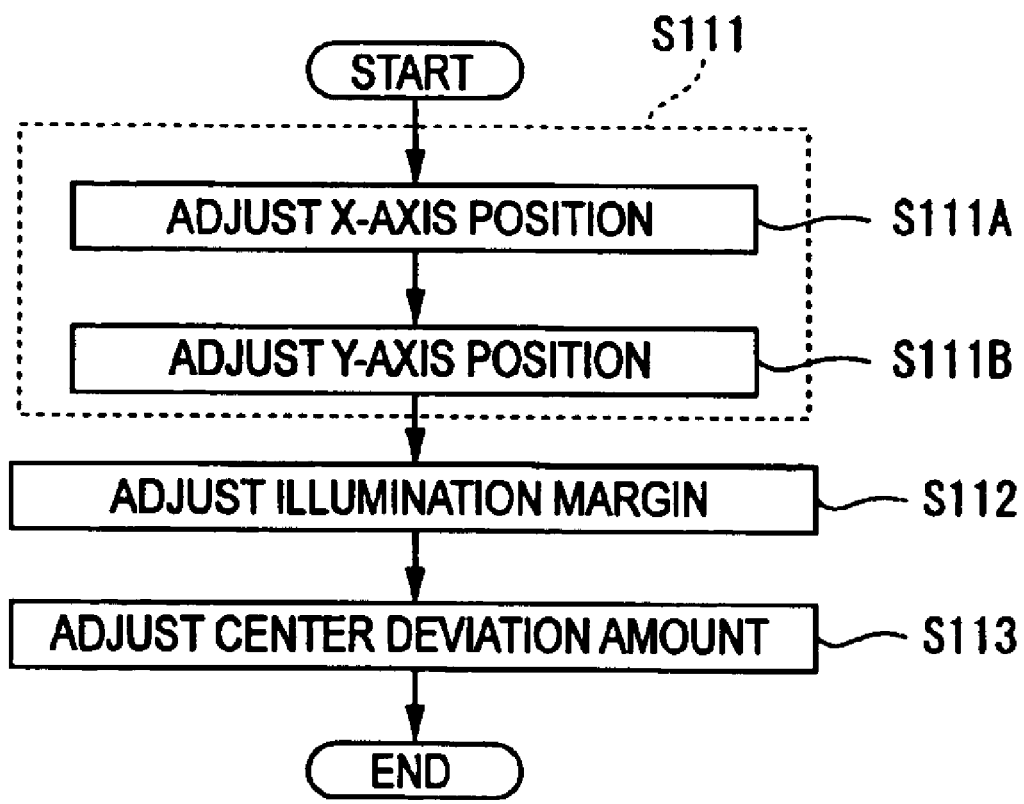
FIG. 25 is a flowchart for explaining the procedure of a beam-splitting-element position-adjusting step according to the above exemplary embodiment.

(K) When it is determined in the step S10 that the first lens array 112A is not located at the optimal position, in other words, when the illumination margin is less than the threshold value data or the center deviation amount is more than the threshold value data, while observing the information A displayed on the display device 61 in step S100, the operator manipulates the position adjustor 30 to perform a position adjustment of the first lens array 112A (beam splitting element position adjusting process: step S11). Specifically, a position adjustment is carried out on the basis of the flow-chart shown in FIG. 25.

Here, the illumination area comparing device 65, when the position adjustor 30 changes the position of the first lens array 112A, calculates the illumination margin and the deviation amount of the center positions in cooperation with such change, and displays the information A on the display device 61. Also, the optimal-state determining device 66 determines whether the position of the first lens array 112A is located at the optimal position, on the basis of the calculated results, and displays the determined results on the display device 61. For this reason, the operator can perform a position adjustment while observing the displayed information A and the determination result.

(K-1) First, the operator manipulates the Y-axis position adjustor 322 and X-axis position adjustor 323 of the adjustor main body 32 in the position adjustor 30, and performs a rough adjustment of the first lens array 112A with respect to the second lens array 112B and the PBS array 112C (step S111).

Specifically, while observing the center deviation amount X displayed on the display device 61, the operator manipulates the X-axis direction adjusting knob 323B to adjust the position of the first lens array 112A in the direction of X axis (X-axis position adjusting step: step S111A).

Further, while observing the center deviation amount Y displayed on the display device 61, the operator manipulates the Y-axis direction adjusting knob 322B to adjust the position of the first lens array 112A in the direction of Y axis (Y-axis position adjusting step: step S111B).

Then, the X-axis position adjusting step S101A and the Y-axis position adjusting step S101B are carried out so as to have the center deviation amount X and the center deviation amount Y of about zero.

(K-2) Next, the operator manipulates the in-plane rotational position adjustor 324 in the position adjustor 30 to adjust the position of the first lens array 112A for the adjustment of the illumination margin (in-plane rotational position adjusting step: step S11). Specifically, the operator manipulates the position fixing portion 324D in the in-plane rotational position adjuster 324 to allow slide movement of the in-plane rotating and sliding plate 324B. Subsequently, while observing the horizontal margin Mh and the vertical margin Mv of the display device 61, the operator manipulates the in-plane rotation adjusting knob 324C to rotate and slide the in-plane rotating and sliding plate 324B to adjust the position of the first lens array 112A.

(K-3) Subsequently, while observing the center deviation amount X and the center deviation amount Y displayed on the display device 61, the operator manipulates the X-axis direction adjusting knob 323B and the Y-axis direction adjusting knob 322B to adjust the position of the first lens array 112A. The adjustment process is conducted so that the center deviation amount X and the center deviation amount Y become about zero (step S113).

(L) Next, ultraviolet rays are irradiated between the light entering-side end face of the holding frame 112D and the first lens array 112A from the ray irradiating part (not shown) installed in the position adjustor 30 through light guide device such as an optical fiber from the ultraviolet ray irradiator 70. Then, the irradiation of ultraviolet rays cures an ultraviolet-ray curing adhesive interposed between the holding frame 112D and the first lens array 112A to adhere and fix the first lens array 112A to the light entering-side end face of the holding frame 112D (second positioning process: step S12).

(M) Then, the clamp switch SW2 provided in the manufacturing apparatus 1 is manipulated, and a pinched state of the first lens array 112A by the beam splitting element pincher 31 is released (step S13). Further, the holding-frame-holder vertical sliding switch SW1 mounted on the manufacturing apparatus 1 is manipulated to cause the holding-frame holder 21 to slide down with respect to the rail 12A (step S14). Moreover, the ultraviolet-ray shielding cover 22 is opened to take out the illumination optical unit 112 (step S15).

The illumination optical unit 112 is manufactured by the processes described above.

Effects of the Exemplary Embodiment

According to the present exemplary embodiment, the following effects are provided.

(1) In the manufacturing method of the illumination optical unit, the criterial frame image 201 and the illumination area LA of the optical image 200 can be accurately compared with each other in the illumination-area comparing step S9 by fetching an optical image detected from the optical image detecting step S7 and performing an image processing using the PC 60. Further, in the optimal-state determining step S10, based on the comparison result calculated in the illumination area comparing step S9, whether the illumination area LA of the optical image 200 is in the optimal state relative to the separating frame image 201 as a designed illumination area or not can be easily and accurately determined by the PC 60. Further, in the beam-splitting-element position-adjusting step S11, when the first lens array 112A is determined not in the optimal state in the optimal state in the optimal state determining step S10, the position of the first lens array 112A relative to the second lens array 112B and the PBS array 112C is easily and accurately adjusted based on the comparison result in the illumination area comparing step S9.

Therefore, the ambiguous accuracy of adjustment with the naked eye as taught in the related art can be improved and the optical relative positions of respective optical elements can be efficiently adjusted with high precision. Therefore, the illumination optical unit 112 can be manufactured with improved light condensation efficiency.

(2) Since the second lens array 112B and the PBS array 112C are positioned and fixed to the holding frame 112D with respect to the outer profile thereof in the first positioning step S1, only by adjusting the position of the first lens array 112A relative to the second lens array 112B and the PBS array 112C in the beam splitting element position adjusting step S11, the second lens array 112B, the PBS array 112C and the first lens array 112A can be easily and accurately relatively located at the optimal position. Also, in the second positioning step S12, the first lens array 112A of which position is adjusted at the optimal position in the beam splitting element position adjusting step S11 can be instantaneously and securely positioned and fixed on the holding frame 112D.

Therefore, the position adjustment of the illumination area of the optical image formed by the illumination optical unit relative to the position of a designed illumination area, in other words, the position adjustment of the second lens array 112B and the PBS array 112C relative to the first lens array 112A, can be carried out by a simpler step and the position can be securely fixed, so that the manufacturing efficiency of the illumination optical unit 112 can be improved.

(3) When the beam is introduced from the illuminator 40 in the beam introducing step S5, though the illuminator 40 basically radiates the beam of a predetermined luminance, the luminance may be temporarily lowered on account of external environment during manufacture process. However, the inclination of the brightness-value adjusting section 303 of the brightness-value adjusting curve 300 acquired during the illumination-area comparing step S9 is not affected by any change of the illuminator 40, and the boundary points H can be acquired on the basis of the linear approximation of such non-affected brightness-value adjusting section 303 as an changing-section approximate straight line 303A. Therefore, the exact illumination area LA of the optical image 200 can be accurately calculated.

(4) Further, in the illumination-area comparing step S9, since the changing-section approximate straight line 303A is calculated using the point A as a reference near a luminance reference value 220 gradation line which serves as a portion with a high linearity, on the basis of the points B and C which are shifted forward and backward by 10 pixels from the point A, an exact approximate straight line whose variation in the inclination of an approximate straight line caused during image fetching is suppressed to the minimum can be acquired. Therefore, the exact illumination area LA of the optical image 200 can be calculated.

(5) In the illumination-margin calculating step S98, the illumination margin (horizontal margin Mh, vertical margin Mv) is calculated according to Expressions (2) and (3) on the basis of the shortest distance Ds (Dsh, Dsv) between the boundary point along one side of a pair of mutually opposed sides of the criterial frame image 201 and the boundary point along the other side thereof, among the boundary points H acquired in step S97, in the direction orthogonal to the pair of sides of the criterial frame image 201, and the distance Da (Dah, Dav) between a pair of pixel positions of the criterial frame image 201.

Therefore, for example, even if any unique boundary point among the plurality of the boundary points H is present, the illumination margin of the whole illumination area LA of the optical image 200 with respect to the criterial frame image 201 can be surely calculated.

(6) The illumination-area comparing step S9 includes the separating-frame-image center-position calculating step S991, the optical-image center-position calculating step S994, and the image-center deviation-amount calculating step S995. As a result, the deviation amount between the central axis of the criterial frame image 201 as a designed illumination area and the central axis of the illumination area LA of the optical image 200 can be calculated.

Further, in the optimal-state determining step S10, when the illumination margin (horizontal margin Mh, vertical margin Mv) is at least the preset threshold value and the deviation amount (center deviation amount X, center deviation amount Y) of the center positions calculated in the image-center deviation-amount calculating step S99 is the preset threshold value or below, the illumination area LA is determined to be in an optimal state. Accordingly, even if any error occurs in some of boundary points H acquired in the illumination-area comparing step S9, the illumination optical unit 112 that ensures the effective illumination margin with respect to the criterial frame image 201 as a designed illumination area and causes no illumination optical axis deviation can be manufactured.

(7) In the beam-splitting-element position-adjusting step S11, based on the information A displayed in the illumination area comparing step S9, the Y-axis position adjustor 322, the X-axis position adjustor 323 and the in-plane rotational position adjustor 324 in the position adjustor 30 are manipulated to perform position adjustments of the first lens array 112A in the direction of X axis, in the direction of Y axis, and in the rotational direction about Z axis and to adjust the illumination margin and the deviation amount of the center positions.

Therefore, the position adjuster 30 can be distinctively manipulated based on the information A, so that the position adjustment of the first lens array 112A can be carried out with high precision and the illumination optical unit 112 can be easily manufactured with high precision.

(8) In the second positioning step S12, an ultraviolet-ray curing adhesive interposed between the first lens array 112A and the light entering-side end face of the holding frame 112D is irradiated with ultraviolet rays from the ray irradiating portion which is connected to the ultraviolet ray irradiator 70 via a light guide device such as an optical fiber. Then, the adhesive is cured to adhere and fix the first lend array 112A to the holding frame 112D.

Therefore, the illumination optical unit 112 can be easily manufactured and the manufacturing efficiency of the illumination optical unit 112 can be improved.

Modification of the Exemplary Embodiment

Moreover, the present invention is not limited to the above exemplary embodiment, but includes modifications and improvements within the scope in which the object of the present invention can be achieved.

In the illumination-area comparing step S9 of the above exemplary embodiment, although the illumination margin M (Mh, Mv) is calculated on the basis of the shortest distance Ds of the illumination area LA based on the acquired boundary points H, and the distance Da between the pixel positions of the criterial frame image 201, the present invention is not limited to this. For example, a relative value of the coordinate value of an acquired predetermined boundary point H with respect to the coordinate value of a predetermined pixel position in the criterial frame image 201, may be employed as the illumination margin M. Moreover, a relative value of the area of an illumination area LA of an optical image 200, which is formed by a group of a plurality of boundary points H, with respect to the area of the criterial frame image 201, may be employed as the illumination margin M. Furthermore, the comparison result indicating the same, larger or smaller illumination area of the optical image relative to the designed illumination area may be used as an item for determining the optimal state.

In the illumination-area comparing step S9, although a plurality of boundary points H are acquired from a plurality of scanning lines and the illumination margin M is calculated on the basis of the acquired boundary points H, the present invention is not limited to this. For example, boundary points H are acquired from a single scanning line. Then, a relative value of the position of the boundary point H with respect to the pixel position of the criterial frame image 201 on the scanning line, or a relative value of the distance between the boundary points H with respect to the distance between the pixel positions of the criterial frame image 201 on the scanning line is acquired. Then, the relative value may be calculated as an illumination margin M.

Moreover, in the illumination-margin calculating step S98, although the illumination margin M (horizontal margin Mh, vertical margin Mv) is calculated according to Expressions (2) and (3) on the basis of the shortest distance Ds (Dsh, Dsv) of the illumination area LA based on the acquired boundary points H and the distance Da (Dah, Dav) between a pair of pixel positions of the criterial frame image 201, the present invention is not limited to this. The illumination margin M may be calculated using any other expression.

In the approximate-straight-line calculating step S95 of the above exemplary embodiment, although a gradation of 220 is set as a luminance reference value in acquiring the changing-section approximate straight line 303A, the present invention is not limited to this. Any other gradation, for example, such as a gradation of 100 may be set as the luminance reference value.

At this time, the luminance reference value may be preset.

Further, the changing-section approximate straight line 303A is acquired on the basis of the pixel points B and C which are shifted forward or backward by 20 pixels, however, the present invention is not limited to this. For example, the approximate straight line can be acquired on the basis of points which are shifted forward and backward by less than or more than 20 pixels. In other words, the changing-section approximate straight line 303A may be acquired using the entire or a part of the brightness-value adjusting section 303.

Moreover, although the linear approximation is made on the basis of the two points B and C in acquiring the changing-section approximate straight line 303A, the linear approximation may be carried out by acquiring three points A, B and C or other three or more points and using a technique such as a least-square method. In summary, any other method can be used so far as the brightness-value adjusting section 303 can be appropriately linearly approximated.

In the boundary-point acquiring step S96 of the above exemplary embodiment, although a pixel position is shifted by 50 pixels as a predetermined number of pixels (step S962), the number of shifted pixels is not particularly limited. For example, the number of shifted pixels may be varied in accordance with the inclination (angle $\phi$ in FIG. 16) of the changing-section approximate straight line 303A. That is, when the inclination is large (angle $\phi$: large), the pixel position is shifted a lot, whereas when the inclination is small (angle $\phi$: small), the pixel position is shifted little. When the point E on the illuminated section 302 is linearly approximated in such manner, a point suitable to be used as a reference can be surely specified. However, the number of pixels to be shifted is not particularly limited.

Further, the border point H may be set at the intersection point G of the changing-section approximate straight line 303A and the 255 gradation line Y2 in the step S961. According to the above arrangement, the steps S962 to S965 can be omitted.

Further, although the illuminated-section approximate straight line 302A is calculated on the basis of the point F in the pixel position of the substantial central portion of the optical image 200, the present invention is not limited to this. The approximate straight line may be calculated on the basis of any other point of the pixel position.

In the above exemplary embodiment, although the constitution using the first lens array 112A as a beam splitting element has been explained, the present invention is not limited to this. For example, a rod or the like may be employed for splitting the entering light into a plurality of partial beams using inside reflection. That is, various optical elements can be employed so far as they can split the light emitted by the light source into a plurality of partial beams.

In the above exemplary embodiment, although as the illumination optical unit 112, the constitution that utilizes the holding frame 112D for integrally incorporating, the first lens array 112A, the second lens array 112B, and the PBS array 112C has been explained, the present invention is not limited to such constitution. That is, any other constitution may be employed, including a constitution in which the first lens array 112A can be positioned with respect to the second lens array 112B and the PBS array 112C, or a constitution in which the above elements are integrally incorporated using a spacer or the like.

Further, the illumination optical unit 112 may be constructed in such a manner that any other optical element such as the superposing lens 113 can be integrally incorporated in addition to the first lens array 112A, the second lens array 112B and the PBS array 112C.

In the above exemplary embodiment, although the illumination optical unit 112 is incorporated using an ultraviolet-ray curing adhesive, the present invention is not limited to this. For example, any other adhesive such as a thermo-setting type adhesive, an elastic system adhesive or an instantaneous system adhesive may be employed.

In the above exemplary embodiment, although the constitution in which the projection screen 14 is formed with the criterial frame 14A has been explained, the present invention is not limited to this. For example, the image processor 64 is provided with a recording device for recording a criterial frame image according to the type of projectors. Also, the illumination area comparing device 65 may be constituted such that a criterial frame image according to the type of a selected projector, among the criterial frame images recorded in the recording device, is compared with the illumination area LA of the optical image 200.

Further, although the projection screen 14 is made of opaque glass, the present invention is not limited to this. For example, the projection screen may be made of any other material such as resin or various plastics such as acryl.

In the above exemplary embodiment, although the illumination optical unit 112 as a target to be manufactured is an optical unit constituting an integrated illumination optical system 10 of the projector 100, the illumination optical unit may not be limited to this, but applied to other uses.

INDUSTRIAL AVAILABILITY

The apparatus for manufacturing illumination optical unit, the method for manufacturing illumination optical unit can be suitably used as a manufacturing apparatus and manufacturing method for manufacturing an illumination optical unit used for a projector. Especially, the present invention can be suitably applied for manufacturing an illumination optical unit in which a beam splitting element, a light focusing element and a polarization converting element are integrated.

What is claimed is:

1. A method of manufacturing an illumination optical unit, including a light source a beam splitting element to split a beam emitted from the light source into a plurality of partial beams; a light focusing element to focus the partial beams; and a polarization converting element to make the polarization directions of the partial beams uniform, the method comprising:

first adjusting a relative position on a predetermined optical path of the light focusing element and the polarization converting element on the basis of the shapes thereof, and fixing the position of the light focusing element and the polarization converting element;

introducing a beam on the light focusing element and the polarization converting element of which position is adjusted during the first adjusting and the beam splitting element disposed on the predetermined optical path;

transmitting the beam introduced by the beam introducing into the light focusing element, the polarization converting element and the beam splitting element to form an optical image on a projection screen;

detecting the optical image formed in the optical image forming;

calculating a comparison result of an illumination area of the optical image detected in the optical image detecting with a designed illumination area;

determining whether the illumination area of the optical image is in the optimal state with respect to the designed illumination area or not on the basis of the comparison result from the illumination-area comparing;

adjusting the relative position of the beam splitting element with respect to the light focusing element and the polarization converting element on the basis of the comparison result calculated in the illumination area comparing, when the illumination area of the optical image is determined not in the optimal position in the optimal-state determining; and fixing the position of the beam splitting element when the illumination area of the optical image is determined to be in the determined optimal state in the optimal-state determining.

2. The method of manufacturing an illumination optical unit according to claim 1, criterial frame representing the shape of the designed illumination area being formed on the projection screen;

the optical image on the projection screen and the criterial frame being detected by an image pick-up device in the optical image detecting;

the illumination-area comparing, comprising:

fetching an image detected in the optical image and the criterial frame detected by the optical image detecting as an image;

acquiring the brightness-value of the optical image in units of pixels by the optical image fetched in the image fetching;

selecting scanning lines set to extending across inside and outside the illumination area of the optical image;

acquiring a brightness-value adjusting curve showing a change in brightness values according to pixel position on the scanning line selected in the scanning-line selecting on the basis of the brightness-value acquired in the brightness-value acquiring;

calculating step of calculating an approximate straight line by linearly approximating a brightness-value adjusting section between a portion showing the outside of the illumination area of the optical image and a portion showing the inside of the illumination area based on the brightness-value adjusting curve acquired by the brightness-value adjusting-curve acquiring;

acquiring boundary points of the illumination area of the optical image on the basis of the approximate straight line calculated in the approximate-straight-line calculating; and calculating an illumination margin of the illumination area of the optical image relative to the criterial frame by comparing the positions of the boundary points acquired in the boundary-point acquiring with the position of the criterial frame.

3. The method of manufacturing an illumination optical unit according to claim 1, wherein the criterial frame is set to be substantially square, the scanning-line selecting, the brightness-value adjusting-curve acquiring, the approximate-straight-line calculating and the boundary-point acquiring being performed a plurality of times along the mutually opposing sides of the criterial frame image, and in the illumination-margin calculating, the illumination margin M is calculated according to the following Expression (1), where Da represents a distance between opposing sides of the criterial frame, and Ds represents a distance between a boundary point along one side of the mutually opposing sides of the criterial frame and another boundary point along the other side of the mutually opposing sides of the criterial frame in a direction orthogonal to the mutually opposing sides $$M=(Ds-Da)/2 \qquad (1).$$

4. The method of manufacturing an illumination optical unit according to claim 1, wherein the illumination-area further comprises:

calculating a center position of the criterial frame from the image fetched in the image fetching;

calculating a center position of the illumination area of the optical image from the positions of boundary points acquired in the boundary points acquiring; and calculating the deviation amount of the center position of the criterial frame and the center position of the illumination area of the optical image; and the optimal-state determining determines that the illumination area of the optical image is in the optimal state when the illumination margin M calculated in the illumination-margin calculating is at least the preset threshold value and when the deviation amount calculated in the center position deviation-amount calculating is the preset threshold value or below.

5. The method of manufacturing an illumination optical unit according to claim 1, wherein the beam-splitting-element positions adjusting, further comprises:

when an optical axis of the beams introduced in the beam introducing is the Z axis and when two axes orthogonal to the Z axis and orthogonal to each other are the X axis and the Y axis, respectively, moving the beam splitting element in the direction of the X axis;

moving the beam splitting element in the direction of the Y axis; and rotating the beam splitting element around the Z axis.

6. The method of manufacturing an illumination optical unit according to claim 1, an uncured photo-curing adhesive being coated on the beam splitting element before the illumination area comparing; and the photo-curing adhesive being irradiated with rays to cure the photo-curing adhesive to fix the beam splitting element in the beam splitting element position-fixing.

7. A method of manufacturing a projector, comprising the method of manufacturing an illumination optical unit according to claim 1.

8. An illumination optical unit manufactured by the method of manufacturing an illumination optical unit according to claim 1.

9. A projector, comprising the illumination optical unit according to claim 8.

10. An apparatus to manufacture an illumination optical unit including a beam splitting element to split a beam emitted from a light source into a plurality of partial beams, a light focusing element to focus the partial beams and a polarization converting element to make polarization directions of the partial beams uniform, the apparatus comprising:

an element holding member to hold the light focusing element and the polarization converting element which are positioned and fixed by adjusting their relative position on the basis of the shapes thereof on a predetermined optical path;

a beam-splitting-element holding member to hold the beam splitting element disposed on the predetermined optical path;

a light source to introduce beams to the beam splitting element, the light focusing element, and the polarization converting element;

a projection screen onto which an optical image of the beams is projected through the beam splitting element, the light focusing element and the polarization converting element;

a position adjusting unit to adjust the relative position of the beam splitting element with respect to the light focusing element and the polarization converting element;

a positioning and fixing unit to fix the position of the beam splitting element;

an image pick-up element to pick up an optical image formed on the projection screen;

an image fetcher to fetch the optical image picked-up by the image pick-up element as an image; and an image processor to process the image fetched by the image fetcher, wherein the image processor including an illumination area comparing device to calculate a comparison result of an illumination area of the optical image with a designed illumination area based on the image fetched by the image fetcher; and an optimal state determining device to determine whether the beam splitting element is located at the optimal position on the basis of the comparison result calculated by the illumination area comparing device.

* * * * *